(12) United States Patent
Spaulding et al.

(10) Patent No.: US 12,409,478 B2
(45) Date of Patent: Sep. 9, 2025

(54) TRANSPORTABLE MACHINE INCLUDING A TRACK SYSTEM

(71) Applicant: MILWAUKEE ELECTRIC TOOL CORPORATION, Brookfield, WI (US)

(72) Inventors: Christopher S. Spaulding, Green Bay, WI (US); Kyle J. Reeder, Waukesha, WI (US); John S. Scott, Brookfield, WI (US); Matt R. Wolf, Milwaukee, WI (US); Timothy J. Hilger, Waterford, WI (US); Christopher J. Derksen, Hartland, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1011 days.

(21) Appl. No.: 17/059,013

(22) PCT Filed: Jun. 10, 2020

(86) PCT No.: PCT/US2020/036914
§ 371 (c)(1),
(2) Date: Nov. 25, 2020

(87) PCT Pub. No.: WO2020/251970
PCT Pub. Date: Dec. 17, 2020

(65) Prior Publication Data
US 2022/0184672 A1 Jun. 16, 2022

Related U.S. Application Data

(60) Provisional application No. 62/987,383, filed on Mar. 10, 2020, provisional application No. 62/924,533,
(Continued)

(51) Int. Cl.
*B08B 9/045* (2006.01)
*B62B 1/10* (2006.01)
(Continued)

(52) U.S. Cl.
CPC ............... *B08B 9/045* (2013.01); *B62B 1/10* (2013.01); *B62B 5/0036* (2013.01); *B62D 55/02* (2013.01);
(Continued)

(58) Field of Classification Search
CPC .. B08B 9/045; B62B 1/10; B62B 1/12; B62B 5/0036; B62B 5/0046; B62B 5/064;
(Continued)

(56) References Cited

U.S. PATENT DOCUMENTS

| | | |
|---|---|---|
| 1,783,256 A | 12/1930 | Miller |
| 1,918,353 A | 7/1933 | Utley |

(Continued)

FOREIGN PATENT DOCUMENTS

| | | |
|---|---|---|
| CN | 201834082 U | 5/2011 |
| CN | 201836655 U | 5/2011 |

(Continued)

OTHER PUBLICATIONS

Wesco Industrial Products Inc, "Stairking Replacement Parts List," Issued Oct. 5, 2006 (1 page).

(Continued)

*Primary Examiner* — Valentin Neacsu
*Assistant Examiner* — Felicia L. Brittman-Alabi
(74) *Attorney, Agent, or Firm* — Michael Best & Friedrich LLP

(57) ABSTRACT

A transportable machine including an elongated frame having a top end and a bottom end, a handle disposed on the top end of the frame, a base disposed on the bottom end of the frame, where the base and the frame together define a space configured to receive and support a load, and a wheel disposed on the bottom end of the frame. A track is coupled to the frame, where the track includes a roller and an endless belt configured to rotate about the roller. A motor is coupled (Continued)

to the roller, where the motor is operable to drive the endless belt, and a power supply provides power to the motor.

14 Claims, 26 Drawing Sheets

Related U.S. Application Data filed on Oct. 22, 2019, provisional application No. 62/859,330, filed on Jun. 10, 2019.

(51) Int. Cl.
```
B62B 1/12      (2006.01)
B62B 5/00      (2006.01)
B62D 55/02     (2006.01)
B62D 55/14     (2006.01)
B62D 55/24     (2006.01)
B62D 55/30     (2006.01)
E03F 9/00      (2006.01)
```
(52) U.S. Cl.
CPC ............. *B62D 55/14* (2013.01); *B62D 55/24* (2013.01); *B62D 55/30* (2013.01); *E03F 9/005* (2013.01); *B62B 1/12* (2013.01); *B62B 2202/50* (2013.01)

(58) Field of Classification Search
CPC . B62B 5/02; B62B 2202/50; B62B 2301/256; B62D 55/02; B62D 55/14; B62D 55/24; B62D 55/30; E03F 7/10; E03F 9/00; E03F 9/005
USPC .................................................. 280/5.2, 5.22
See application file for complete search history.

(56) References Cited

U.S. PATENT DOCUMENTS

| | | |
|---|---|---|
| 1,990,686 A | 2/1935 | Einhorn et al. |
| 2,069,871 A | 2/1937 | Blanc |
| 2,111,527 A | 3/1938 | Blanc |
| 2,115,266 A | 4/1938 | Johnson |
| 2,167,268 A | 7/1939 | Sanger |
| 2,223,005 A | 11/1940 | Kerber |
| 2,225,129 A | 12/1940 | Osborn |
| 2,244,735 A | 6/1941 | Siverman |
| 2,246,056 A | 6/1941 | McKenzie |
| 2,255,800 A | 9/1941 | Miller |
| 2,267,493 A | 12/1941 | Clotz |
| 2,282,600 A | 5/1942 | Blanc |
| 2,288,771 A | 7/1942 | Babcock |
| 2,291,253 A | 7/1942 | Osborn |
| 2,355,733 A | 8/1944 | Johnson et al. |
| 2,426,265 A | 8/1947 | Gavin |
| 2,466,493 A | 4/1949 | Sketchley |
| 2,468,490 A | 4/1949 | Joseph |
| 2,552,808 A | 5/1951 | O'Brien |
| 2,562,574 A | 7/1951 | Poekert |
| 2,610,807 A | 9/1952 | O'Brien |
| 2,619,665 A | 12/1952 | Hopkins et al. |
| 2,661,489 A | 12/1953 | Rudolph et al. |
| 2,730,740 A | 1/1956 | O'Brien |
| 2,765,149 A | 10/1956 | Christodolu |
| 2,786,218 A | 3/1957 | Yousem |
| 2,836,838 A | 6/1958 | Kollmann |
| 2,880,435 A | 4/1959 | Deutsch et al. |
| 2,926,372 A | 3/1960 | O'Brien |
| 2,930,584 A | 3/1960 | Hensley et al. |
| 2,955,307 A | 10/1960 | Hunt |
| 3,007,186 A | 11/1961 | Olsson |
| 3,025,547 A | 3/1962 | Ciaccio |
| 3,048,870 A | 8/1962 | Criscuolo |
| 3,075,217 A | 1/1963 | Kollmann |
| 3,086,234 A | 4/1963 | Crane |
| 3,118,159 A | 1/1964 | Kollmann |
| 3,134,119 A | 5/1964 | Criscuolo |
| 3,149,480 A | 9/1964 | Hunt |
| 3,159,861 A | 12/1964 | Sarcone |
| 3,162,878 A | 12/1964 | Agostino |
| 3,206,782 A | 9/1965 | Larsen |
| 3,246,354 A | 4/1966 | Cooney et al. |
| 3,254,851 A | 6/1966 | Caperton |
| 3,283,353 A | 11/1966 | Kirk |
| 3,298,051 A | 1/1967 | Ratliff |
| 3,330,533 A | 7/1967 | Blume |
| 3,372,417 A | 3/1968 | Devine |
| 3,397,420 A | 8/1968 | Schneider |
| 3,414,926 A | 12/1968 | Bloom |
| 3,449,003 A | 6/1969 | Hunt |
| 3,451,089 A | 6/1969 | Carlson et al. |
| 3,451,090 A | 6/1969 | Presti et al. |
| 3,457,580 A | 7/1969 | Meyers |
| 3,469,273 A | 9/1969 | Caperton |
| 3,544,051 A | 12/1970 | Norman |
| 3,561,034 A | 2/1971 | Caperton |
| 3,605,158 A | 9/1971 | Russell |
| 3,691,583 A | 9/1972 | Silverman et al. |
| 3,706,110 A | 12/1972 | Siegal |
| 3,740,785 A | 6/1973 | Latall |
| 3,747,153 A | 7/1973 | O'Neill |
| 3,885,148 A | 3/1975 | Di Benedetto |
| 3,882,565 A | 5/1975 | Irwin et al. |
| 3,897,602 A | 8/1975 | Waterbury |
| 3,928,885 A | 12/1975 | Peterson et al. |
| 3,950,934 A | 4/1976 | Irwin |
| 3,958,293 A | 5/1976 | Irwin |
| 4,042,305 A | 8/1977 | Vincent |
| 4,069,534 A | 1/1978 | Martin |
| 4,104,757 A | 8/1978 | Silverman |
| 4,153,966 A | 5/1979 | Irwin |
| 4,188,683 A | 2/1980 | Klunder |
| 4,218,802 A | 8/1980 | Babb et al. |
| 4,244,072 A | 1/1981 | Dunham et al. |
| 4,280,852 A | 7/1981 | Dunham et al. |
| 4,284,931 A | 8/1981 | Ehret |
| 4,290,162 A | 9/1981 | Agostino |
| 4,292,704 A | 10/1981 | Joanis, Sr. |
| 4,356,557 A | 10/1982 | Bell et al. |
| 4,364,139 A | 12/1982 | Babb et al. |
| 4,395,791 A | 8/1983 | Irwin |
| 4,403,885 A | 9/1983 | Babb |
| 4,420,852 A | 12/1983 | Bowlsby |
| 4,464,806 A | 8/1984 | Prange |
| 4,508,468 A | 4/1985 | Irwin |
| 4,540,017 A | 9/1985 | Prange |
| 4,566,551 A | 1/1986 | Feliz |
| 4,570,281 A | 2/1986 | Boelens |
| 4,580,306 A | 4/1986 | Irwin |
| 4,611,360 A | 9/1986 | Irwin |
| 4,644,603 A | 2/1987 | Meyer |
| 4,686,732 A | 8/1987 | Irwin |
| 4,692,957 A | 9/1987 | Kovacs |
| 4,700,422 A | 10/1987 | Russell |
| 4,716,613 A | 1/1988 | Irwin |
| 4,771,500 A | 9/1988 | Kovacs |
| 4,773,113 A | 9/1988 | Russell |
| 4,774,739 A | 10/1988 | Sherman, Jr. |
| 4,887,929 A | 12/1989 | Hale |
| 4,914,775 A | 4/1990 | Kirk |
| 4,916,772 A | 4/1990 | Russell et al. |
| 4,919,558 A | 4/1990 | Mascitelli et al. |
| 4,926,518 A | 5/1990 | Mikol |
| 4,943,182 A | 7/1990 | Hoblingre |
| 4,956,889 A | 9/1990 | Kirk |
| 5,009,242 A | 4/1991 | Prange |
| 5,029,356 A | 7/1991 | Silverman et al. |
| 5,031,263 A | 7/1991 | Babb et al. |
| 5,031,276 A | 7/1991 | Babb et al. |
| 5,056,176 A | 10/1991 | Belcher |
| 5,181,668 A | 1/1993 | Tsuji et al. |
| 5,182,833 A | 2/1993 | Yamaguchi et al. |
| 5,193,242 A | 3/1993 | Irwin |
| 5,199,129 A | 4/1993 | Salecker et al. |

(56) References Cited

U.S. PATENT DOCUMENTS

| | | |
|---|---|---|
| 5,222,270 A | 6/1993 | Sloter et al. |
| 5,226,207 A | 7/1993 | Elzaurdia |
| 5,230,116 A | 7/1993 | Rodriguez |
| 5,239,724 A | 8/1993 | Salecker et al. |
| 5,309,595 A | 5/1994 | Salecker et al. |
| 5,329,662 A | 7/1994 | Salecker |
| 5,335,388 A | 8/1994 | Salecker |
| 5,390,389 A | 2/1995 | Rutkowski et al. |
| 5,418,997 A | 5/1995 | DeFrange |
| 5,440,216 A | 8/1995 | Kim |
| 5,507,062 A | 4/1996 | Salecker |
| 5,526,975 A | 6/1996 | Endo |
| 5,535,473 A | 7/1996 | Maniar |
| 5,588,171 A | 12/1996 | Hamann |
| 5,618,123 A | 4/1997 | Pulse |
| 5,622,319 A | 4/1997 | Babb et al. |
| 5,636,648 A | 6/1997 | O'Brien et al. |
| 5,640,736 A | 6/1997 | Salecker |
| 5,657,505 A | 8/1997 | Gallagher et al. |
| 5,755,002 A | 5/1998 | Lacy |
| 5,768,741 A | 6/1998 | Leiman et al. |
| 5,862,561 A | 1/1999 | Irwin |
| 5,901,401 A | 5/1999 | Rutkowski et al. |
| 5,933,903 A | 8/1999 | Irwin |
| 5,987,683 A | 11/1999 | Leiman et al. |
| 5,996,159 A | 12/1999 | Irwin |
| 6,009,588 A | 1/2000 | Rutkowski |
| 6,040,660 A | 3/2000 | Schmidt et al. |
| 6,076,219 A | 6/2000 | Irwin |
| 6,158,076 A | 12/2000 | Rutkowski et al. |
| 6,243,905 B1 | 6/2001 | Rutkowski |
| 6,343,398 B1 | 2/2002 | Silverman et al. |
| 6,360,397 B1 | 3/2002 | Babb |
| 6,360,757 B1 | 3/2002 | Bohrer |
| 6,381,798 B1 | 5/2002 | Rutkowski et al. |
| 6,412,136 B1 | 7/2002 | Rutkowski |
| 6,421,871 B1 | 7/2002 | Peach et al. |
| 6,457,841 B1 | 10/2002 | Lynch et al. |
| 6,532,404 B2 | 3/2003 | Colens |
| 6,538,732 B1 | 3/2003 | Drost et al. |
| 6,546,582 B2 | 4/2003 | Silverman |
| 6,594,849 B1 | 7/2003 | Nimens |
| 6,615,436 B1 | 9/2003 | Burch, Jr. et al. |
| 6,615,440 B1 | 9/2003 | Williams |
| 6,618,892 B2 | 9/2003 | Schmitt |
| 6,637,064 B2 | 10/2003 | Silverman et al. |
| 6,655,228 B1 | 12/2003 | Marghrio et al. |
| 6,745,487 B1 | 6/2004 | Nield |
| 6,760,948 B2 | 7/2004 | Schmitt |
| 6,898,807 B2 | 5/2005 | Tash |
| 6,925,679 B2 | 8/2005 | Wallach et al. |
| 6,953,260 B1 | 10/2005 | Allen |
| 6,956,348 B2 | 10/2005 | Landry et al. |
| 7,007,399 B2 | 3/2006 | Catalano |
| 7,009,698 B2 | 3/2006 | Drost et al. |
| 7,052,554 B2 | 5/2006 | Rothenberger |
| 7,073,224 B2 | 7/2006 | Schmitt |
| 7,168,824 B2 | 1/2007 | Schnell |
| 7,186,002 B2 | 3/2007 | Matthews et al. |
| 7,191,673 B2 | 3/2007 | Thornhill et al. |
| 7,222,383 B2 | 5/2007 | Hale |
| 7,269,874 B2 | 9/2007 | Hung |
| 7,281,815 B1 | 10/2007 | Gustafson |
| 7,288,912 B2 | 10/2007 | Landry et al. |
| 7,344,270 B2 | 3/2008 | Kim |
| 7,367,077 B2 | 5/2008 | Rutkowski et al. |
| 7,373,689 B2 | 5/2008 | Bowden et al. |
| 7,402,961 B2 | 7/2008 | Bayat et al. |
| 7,459,871 B2 | 12/2008 | Landry et al. |
| 7,478,451 B2 | 1/2009 | Rutkowski et al. |
| 7,480,041 B2 | 1/2009 | Lindner |
| 7,549,766 B2 | 6/2009 | Sharrah et al. |
| D595,911 S | 7/2009 | Rutkowski et al. |
| 7,652,216 B2 | 1/2010 | Sharrah et al. |
| 7,674,003 B2 | 3/2010 | Sharrah et al. |
| 7,676,879 B1 | 3/2010 | Rutenberg et al. |
| 7,685,669 B2 | 3/2010 | Rutkowski et al. |
| 7,757,332 B1 | 7/2010 | Hale |
| 7,761,948 B2 | 7/2010 | Irwin |
| 7,765,626 B2 | 8/2010 | Sapia |
| 7,770,253 B2 | 8/2010 | Ha et al. |
| 7,810,203 B2 | 10/2010 | Stolz |
| 7,888,883 B2 | 2/2011 | Crawford et al. |
| 7,889,980 B2 | 2/2011 | Sooy |
| 7,891,038 B2 | 2/2011 | Hale |
| 7,935,192 B2 | 5/2011 | Silverman et al. |
| 8,046,862 B2 | 11/2011 | Eisermann et al. |
| 8,054,459 B2 | 11/2011 | Lindner |
| 8,060,968 B2 | 11/2011 | Babb et al. |
| 8,091,333 B2 | 1/2012 | Lee |
| 8,176,593 B2 | 5/2012 | Gress et al. |
| 8,253,368 B2 | 8/2012 | Landry et al. |
| 8,261,397 B2 | 9/2012 | Lee |
| 8,365,337 B2 | 2/2013 | Tash |
| 8,378,613 B2 | 2/2013 | Landry et al. |
| 8,386,081 B2 | 2/2013 | Landry et al. |
| 8,413,347 B2 | 4/2013 | Gress et al. |
| 8,428,778 B2 | 4/2013 | Landry et al. |
| 8,434,186 B2 | 5/2013 | Wildauer et al. |
| RE44,281 E | 6/2013 | Snyder |
| 8,456,125 B2 | 6/2013 | Landry et al. |
| 8,458,845 B1 | 6/2013 | Tabieros |
| 8,505,146 B1 | 8/2013 | Jessup |
| 8,510,891 B2 | 8/2013 | Fivecoate |
| 8,529,086 B2 | 9/2013 | Skrivan et al. |
| 8,553,340 B2 | 10/2013 | Drost et al. |
| 8,584,297 B2 | 11/2013 | Tash |
| 8,594,840 B1 | 11/2013 | Chiappetta et al. |
| 8,598,829 B2 | 12/2013 | Landry et al. |
| 8,615,837 B2 | 12/2013 | Hale et al. |
| 8,646,143 B2 | 2/2014 | Lokkinen |
| 8,781,626 B2 | 7/2014 | Landry et al. |
| 8,817,252 B2 | 8/2014 | Lindner |
| 8,826,483 B2 | 9/2014 | Rutkowski et al. |
| 8,838,268 B2 | 9/2014 | Friedman et al. |
| 8,871,030 B2 | 10/2014 | Chen et al. |
| 8,931,131 B1 | 1/2015 | Feduke |
| 8,931,973 B2 | 1/2015 | Olszewski |
| 8,970,211 B1 | 3/2015 | Olsson et al. |
| 8,984,698 B1 | 3/2015 | Olsson |
| 9,009,906 B2 | 4/2015 | Hale et al. |
| 9,015,889 B1 | 4/2015 | Khonsary |
| 9,015,890 B1 | 4/2015 | Owens |
| 9,018,848 B2 | 4/2015 | Garcia |
| 9,041,794 B1 | 5/2015 | Olsson et al. |
| 9,055,848 B2 | 6/2015 | Liu et al. |
| 9,060,407 B2 | 6/2015 | West |
| 9,080,599 B2 | 7/2015 | Rutkowski et al. |
| 9,144,138 B2 | 9/2015 | Xie |
| 9,144,361 B2 | 9/2015 | Landry et al. |
| 9,173,539 B2 | 11/2015 | Yoon et al. |
| 9,194,114 B2 | 11/2015 | Petry |
| 9,217,245 B2 | 12/2015 | Yu |
| 9,234,342 B1 | 1/2016 | Beesley et al. |
| 9,260,847 B2 | 2/2016 | Silverman et al. |
| 9,346,085 B2 | 5/2016 | Khani Moghanaki |
| 9,402,524 B2 | 8/2016 | Yoon et al. |
| 9,414,731 B2 | 8/2016 | Soejima |
| 9,456,182 B2 | 9/2016 | Stenson |
| 9,526,390 B2 | 12/2016 | Yi et al. |
| 9,533,856 B2 | 1/2017 | Spelich et al. |
| 9,670,656 B2 | 6/2017 | Rutkowski et al. |
| 9,723,962 B2 | 8/2017 | Yoon et al. |
| 9,733,549 B2 | 8/2017 | Drost et al. |
| 10,479,385 B2 * | 11/2019 | Collibault ................ B62B 1/12 |
| 2001/0038786 A1 | 11/2001 | Kim |
| 2003/0182754 A1 | 10/2003 | O'Brian |
| 2003/0231927 A1 | 12/2003 | Hale |
| 2004/0204792 A1 | 10/2004 | Taylor et al. |
| 2004/0255415 A1 | 12/2004 | Silva |
| 2005/0028307 A1 | 2/2005 | Wu |
| 2005/0166355 A1 | 8/2005 | Tani |
| 2005/0183229 A1 | 8/2005 | Uehigashi |
| 2006/0130646 A1 | 6/2006 | Sep et al. |

(56) References Cited

U.S. PATENT DOCUMENTS

| | | |
|---|---|---|
| 2006/0193129 A1 | 8/2006 | Opolka |
| 2007/0033752 A1 | 2/2007 | Hung |
| 2008/0098544 A1 | 5/2008 | Rutkowski et al. |
| 2008/0148503 A1 | 6/2008 | Babb et al. |
| 2008/0229527 A1 | 9/2008 | Berry |
| 2008/0244816 A1 | 10/2008 | Babb et al. |
| 2009/0083915 A1 | 4/2009 | Cicchelli et al. |
| 2009/0208282 A1 | 8/2009 | Hale |
| 2009/0300863 A1 | 12/2009 | Bartucciotto |
| 2010/0017981 A1 | 1/2010 | Hamm et al. |
| 2010/0053942 A1 | 3/2010 | Tarter et al. |
| 2010/0132143 A1 | 6/2010 | Flamand |
| 2010/0293742 A1 | 11/2010 | Chung et al. |
| 2011/0035883 A1 | 2/2011 | Vogel et al. |
| 2011/0182656 A1 | 7/2011 | Babb |
| 2011/0242799 A1 | 10/2011 | Dyer |
| 2012/0110761 A1 | 5/2012 | Ripperger et al. |
| 2012/0140457 A1 | 6/2012 | McQuade |
| 2012/0300057 A1 | 11/2012 | Bartucciotto |
| 2013/0192907 A1 | 8/2013 | Sarokham et al. |
| 2014/0115802 A1 | 5/2014 | Yu |
| 2014/0247338 A1 | 9/2014 | Kessler |
| 2014/0268682 A1 | 9/2014 | Brady |
| 2014/0271095 A1 * | 9/2014 | Umans ............... B62B 1/12 414/800 |
| 2014/0289991 A1 | 10/2014 | Landy et al. |
| 2015/0104241 A1 | 4/2015 | Spelich et al. |
| 2015/0176637 A1 | 6/2015 | Dunkin et al. |
| 2015/0185322 A1 | 7/2015 | Haegermarck |
| 2015/0250299 A1 | 9/2015 | Danzeisen |
| 2015/0329380 A1 | 11/2015 | Zhu et al. |
| 2016/0175899 A1 | 6/2016 | Dunkin et al. |
| 2016/0219205 A1 | 7/2016 | Kessler |
| 2017/0191646 A1 | 7/2017 | Marie et al. |
| 2017/0268315 A1 | 9/2017 | Reyes et al. |
| 2018/0119406 A1 | 5/2018 | Scott et al. |
| 2019/0210078 A1 | 7/2019 | Davies et al. |
| 2019/0315385 A1 | 10/2019 | Wolf et al. |

FOREIGN PATENT DOCUMENTS

| | | | |
|---|---|---|---|
| CN | 201844212 U | 5/2011 | |
| CN | 202516816 U | 11/2012 | |
| CN | 202577502 U | 12/2012 | |
| CN | 206247092 U | 6/2017 | |
| CN | 206310294 U | 7/2017 | |
| DE | 1942086 U | 7/1966 | |
| DE | 2244206 A1 | 3/1974 | |
| DE | 3423464 A1 | 1/1986 | |
| DE | 20111229 U1 | 10/2001 | |
| DE | 10248411 A1 | 4/2004 | |
| DE | 102012109648 A1 | 4/2014 | |
| EP | 443290 B1 * | 3/1995 | ............ B08B 9/045 |
| EP | 1375763 A1 | 1/2004 | |
| EP | 1930649 A1 | 6/2008 | |
| EP | 2502681 A2 | 9/2012 | |
| GB | 1118126 A | 6/1968 | |
| GB | 1217090 A | 12/1970 | |
| GB | 2142944 A | 1/1985 | |
| KR | 20150055804 A * | 5/2015 | ............ B05B 1/02 |
| WO | WO2001077575 A1 | 10/2001 | |
| WO | WO2006080918 A1 | 8/2006 | |
| WO | WO2006112847 A1 | 10/2006 | |
| WO | WO2006112848 A1 | 10/2006 | |
| WO | WO2010053374 A1 | 5/2010 | |
| WO | WO2011036691 A1 | 3/2011 | |

OTHER PUBLICATIONS

Global Industrial, "Wesco Stairking Battery Powered Stair Climbing Appliance Hand Truck 230051 66"H," <https://www.globalindustrial.com/p/material-handling/hand-trucks-dollies/hand-trucks-appliance-stair-climbing/battery-powered-stair-climbing-appliance-hand-truck-66-h-850-lb-capacity>, webpage publicly available at least as early as Nov. 11, 2017.

Handtrucks2Go, "Escalera Staircat Powered Stair Climber Hand Truck," <https://handtrucks2go.com/Escalera-Electric-Stair-Climber.html>, webpage accessed Apr. 13, 2018.

Global Industrial, "Industrial Strength Steel Hand Truck with Curved Handle & Stair Climbers 600 Lb. Capacity," <https://www.globalindustrial.com/p/material-handling/hand-trucks-dollies/hand-trucks-steel/industrial-strength-steel-hand-truck-curved-handle-with-stair-climbers>, web page accessed Apr. 13, 2018.

International Search Report and Written Opinion for Application No. PCT/US2020/036914 dated Sep. 21, 2020 (19 pages).

Extended European Search Report for Application No. 20822897.3 dated Sep. 29, 2023 (9 pages).

* cited by examiner

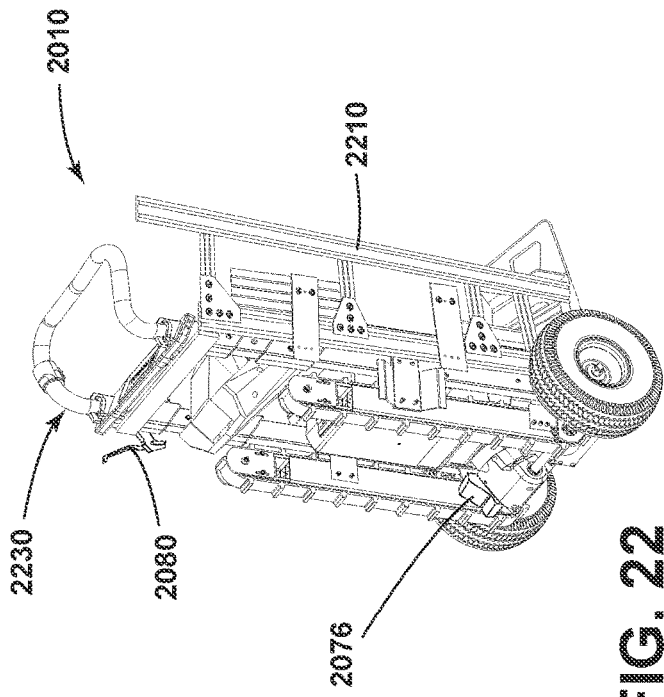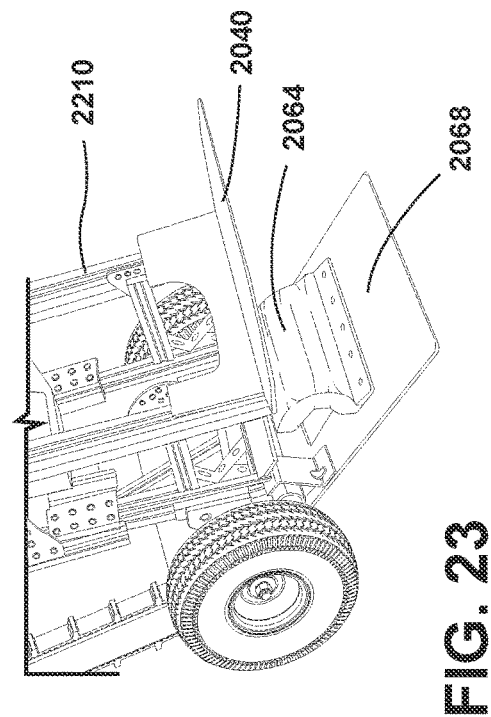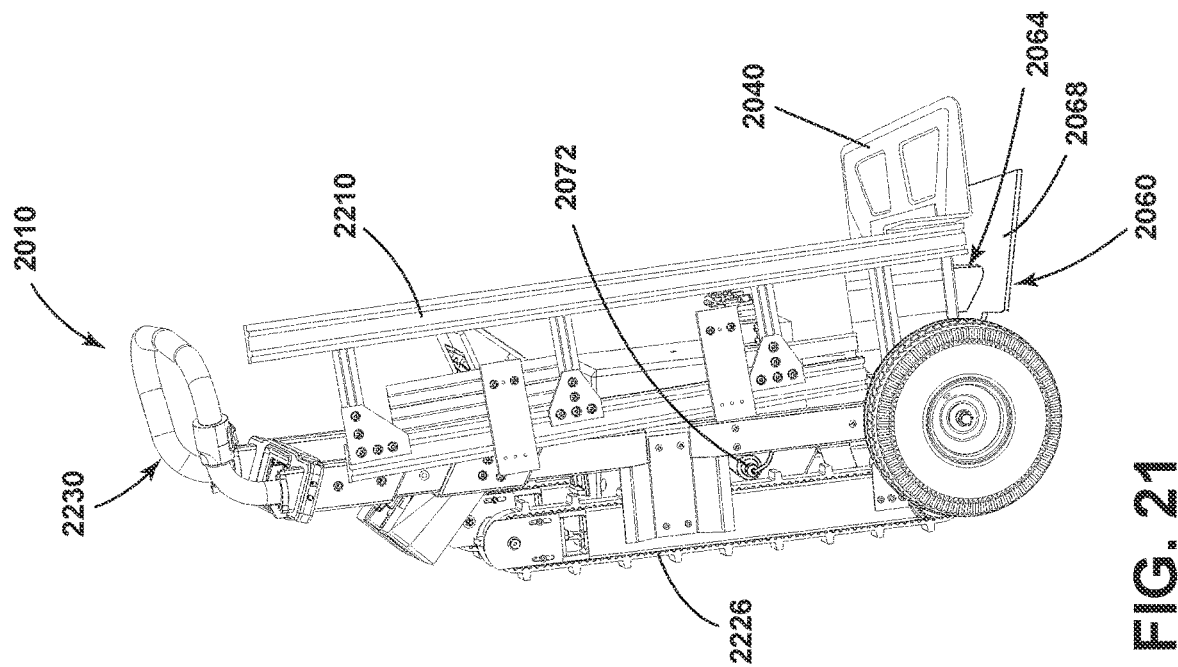

TRANSPORTABLE MACHINE INCLUDING A TRACK SYSTEM

CROSS-REFERENCE TO RELATED APPLICATIONS

This application is a national phase filing under 35 U.S.C. 371 of International Application No. PCT/US2020/036914 filed Jun. 10, 2020, which claims priority to U.S. Provisional Patent Application No. 62/859,330 filed Jun. 10, 2019, U.S. Provisional Patent Application No. 62/924,533 filed Oct. 22, 2019, and U.S. Provisional Patent Application No. 62/987,383 filed Mar. 10, 2020, the entire contents of which are incorporated by reference herein.

FIELD OF INVENTION

The present disclosure relates to a dolly or hand truck for transporting a load. Furthermore, the present disclosure relates to sewer cleaning machines used to remove or dislodge debris caught in a drain or pipe.

BACKGROUND

Sewer cleaning machines are used to clean clogs and debris out of drains, sewers, and the like. Smaller handheld drain cleaners may be used to clean household drains from sinks or shower drains. However, larger and heavier cleaning machines are often used to clean sewers and industrial drains. A sewer cleaning machine may have as much as 200-300 feet of cable and a weight of 200-300 lbs. Accordingly, some sewer cleaning machines may be cumbersome to transport.

Hand trucks are used to transport a load from a first location to a second location. Hand trucks may be able to transport relatively large loads. Accordingly, some hand trucks may be helpful in transporting large machines or tools, such as a sewer cleaning machine. However, hand trucks also have limitations. For example, hand trucks are primarily helpful when transporting a load on a relatively flat or a smooth surface, or when the load does not get overly heavy. However, a hand truck may be cumbersome to transport when the load becomes too large, or when the hand truck must be used to transport a load up a set of stairs.

SUMMARY

In one embodiment, the present disclosure provides a transportable machine including an elongated frame having a top end and a bottom end, a handle disposed on the top end of the frame, a base disposed on the bottom end of the frame, where the base and the frame together define a space configured to receive and support a load, and a wheel disposed on the bottom end of the frame. A track is coupled to the frame, where the track includes a roller, an endless belt configured to rotate about the roller, and a belt tensioning assembly configured to tension the endless belt. The belt tensioning assembly includes a bracket supporting the roller, a mount coupled to the frame, and an adjustment member configured to adjust the position of the bracket relative to the mount. A motor is coupled to the roller, where the motor is operable to drive the endless belt.

In another embodiment, the present disclosure provides a transportable machine including an elongated frame having a top end and a bottom end, a handle disposed on the top end of the frame, a base disposed on the bottom end of the frame, where the base and the frame together define a space configured to receive and support a load, and a wheel disposed on the bottom end of the frame. A track is coupled to the frame, where the track includes a roller and an endless belt configured to rotate about the roller. A motor is coupled to the roller, where the motor is operable to drive the endless belt, a power supply provides power to the motor, and a controller is coupled to the power supply and the motor. The controller is configured to monitor the power supply, determine when the power supply is insufficient to climb a set of stairs, and in response to determining that the power supply is insufficient to climb the set of stairs, send a signal to alert a user, to shutoff the motor, or both.

In another embodiment, the present disclosure provides a transportable machine including an elongated frame having a top end and a bottom end, a handle disposed on the top end of the frame, a base disposed on the bottom end of the frame, where the base and the frame together define a space configured to receive and support a load, a wheel disposed on the bottom end of the frame, a track coupled to the frame, where the track includes a roller and an endless belt configured to rotate about the roller, and a motor coupled to the roller. The motor is operable to drive the endless belt in a first direction at a first speed and in a second direction at a second speed, where the second speed is slower than the first speed.

In another embodiment, the present disclosure provides a transportable machine including an elongated frame having a top end and a bottom end, a handle disposed on the top end of the frame, a base disposed on the bottom end of the frame, where the base and the frame together define a space configured to receive and support a load, a wheel disposed on the bottom end of the frame, and a track coupled to the frame. The track includes a roller and an endless belt configured to rotate about the roller, where the endless belt has a recess extending along an inside surface, and the recess receives a rib on the frame to align the endless belt relative to the frame. A motor is coupled to the roller, where the motor is operable to drive the endless belt.

In another embodiment, the present disclosure provides a transportable machine including an elongated frame having a top end and a bottom end, a handle disposed on the top end of the frame, a base disposed on the bottom end of the frame, where the base and the frame together define a space configured to receive and support a load, and a wheel disposed on the bottom end of the frame. A track is coupled to the frame, where the track includes a roller and an endless belt configured to rotate about the roller. A motor is coupled to the roller, where the motor is operable to drive the endless belt. A sewer cleaning machine is supported by the base, where the sewer cleaning machine includes a drum and a cable positioned at least partially within the drum. A support system is configured to support the transportable machine on a surface and inhibits the transportable machine from tipping, where the support system includes one or more supports positioned below the base.

In another embodiment, the present disclosure provides a transportable machine including an elongated frame having a top end and a bottom end, a handle disposed on the top end of the frame, a base disposed on the bottom end of the frame, where the base and the frame together define a space configured to receive and support a load, and a wheel disposed on the bottom end of the frame. A track is coupled to the frame, where the track includes a roller and an endless belt configured to rotate about the roller. The track is movable relative to the elongated frame between a stored position and an extended position, where the track is positioned farther away from the frame when in the extended position than in the stored position. A motor is coupled to the roller, where the motor is operable to drive the endless belt.

In another embodiment, the present disclosure provides a transportable machine including an elongated frame having a top end and a bottom end, a handle disposed on the top end of the frame, a base disposed on the bottom end of the frame, where the base and the frame together define a space configured to receive and support a load, and a wheel disposed on the bottom end of the frame. A track is coupled to the frame, where the track includes a roller and an endless belt configured to rotate about the roller. A motor is coupled to the roller, where the motor is operable to drive the endless belt. A lifting system is configured to tilt the base relative to a support surface.

The above aspects may be implemented in different combinations and not necessarily in the ordered presented. Other aspects of the disclosure will become apparent by consideration of the detailed description and accompanying drawings.

BRIEF DESCRIPTION OF THE DRAWINGS

FIG. 21 is another perspective view of the transportable machine of FIG. 19.

FIG. 22 is a rear perspective view of the transportable machine of FIG. 19, illustrating an air bag member.

FIG. 23 is a partial perspective view of a base of the transportable machine of FIG. 21.

DETAILED DESCRIPTION

Figure 1:
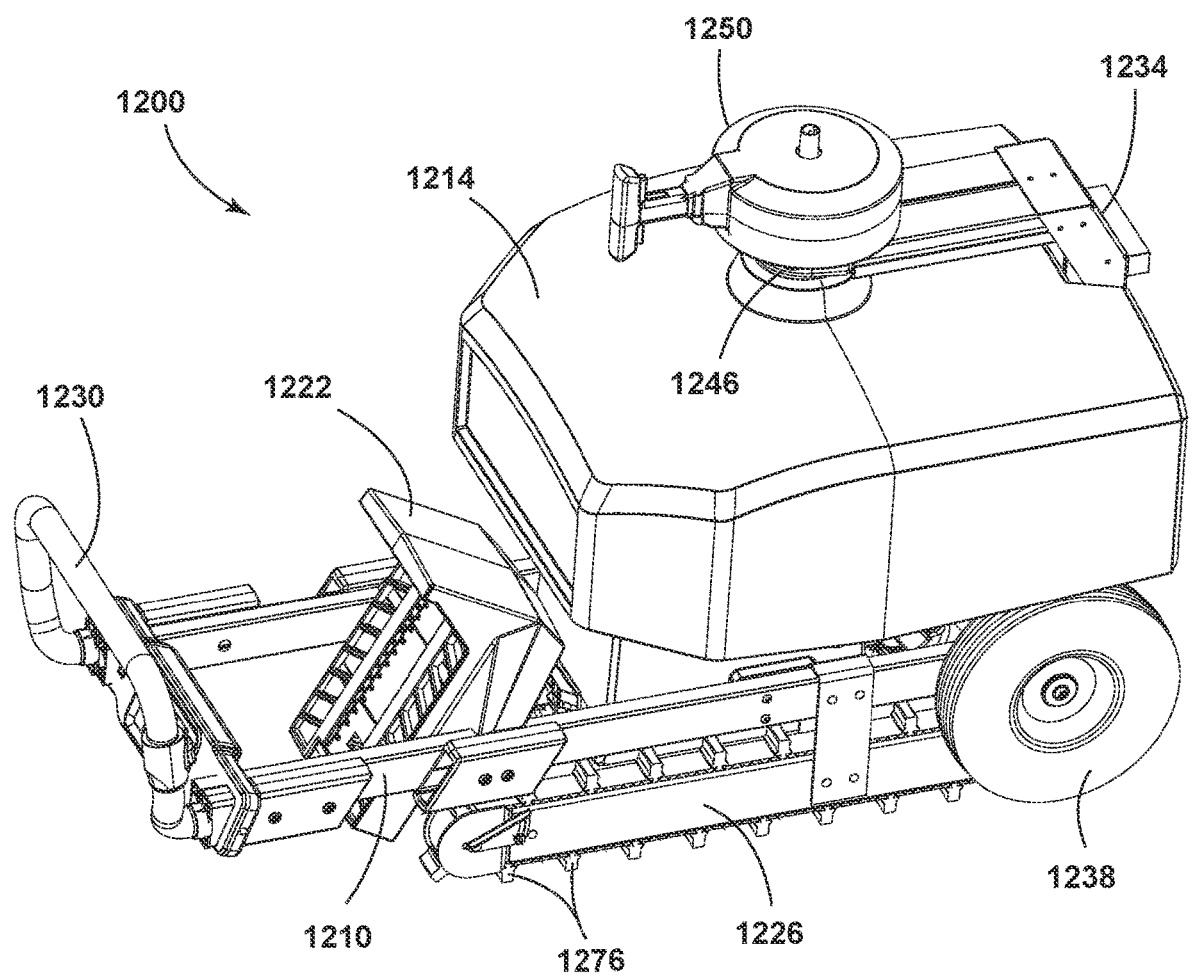
FIG. 1 is a front perspective view of a sewer cleaning machine.
Figure 2:
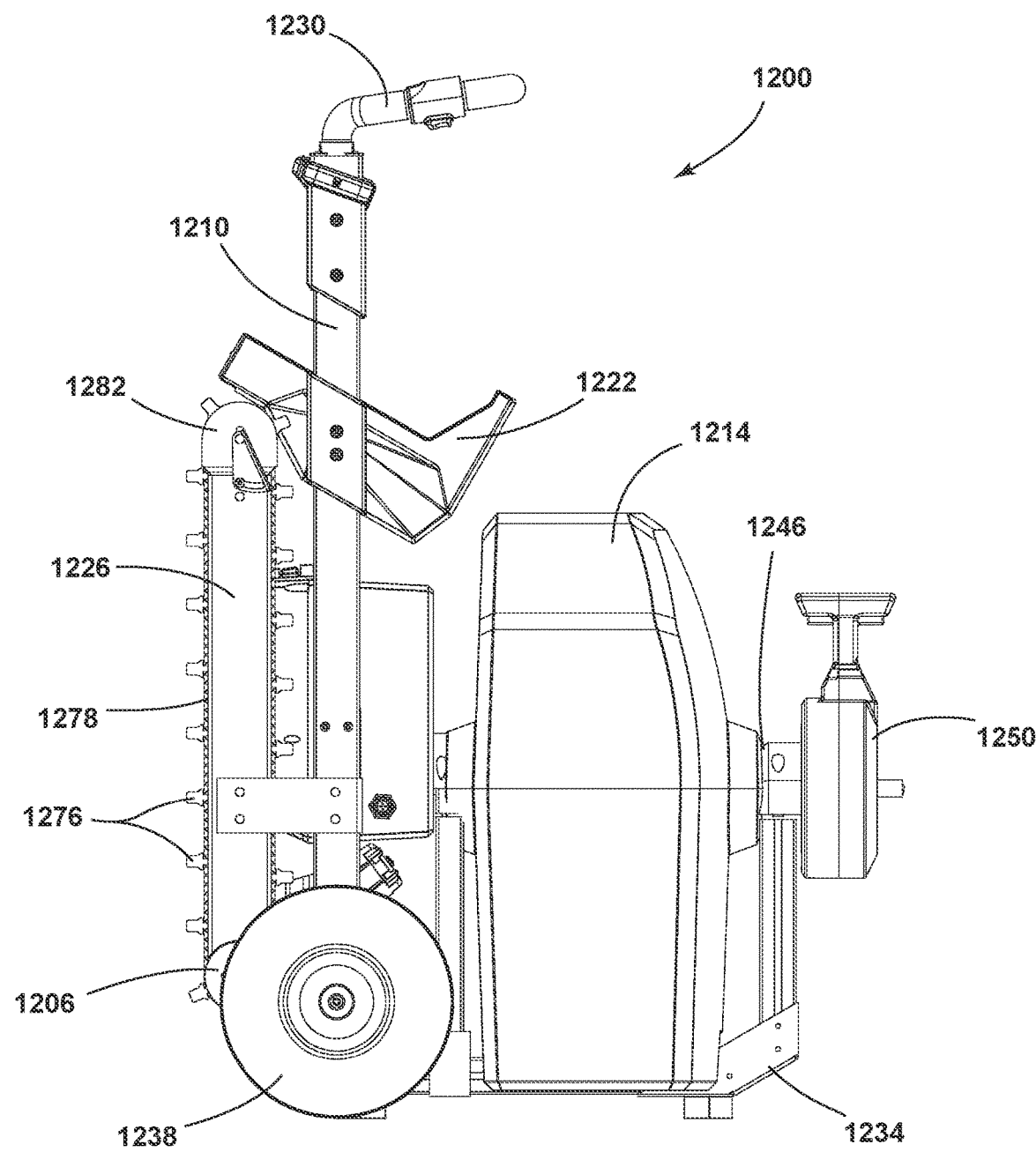
FIG. 2 is a side view of the transportable machine of FIG. 1.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

FIGS. 1-4 illustrate a transportable machine according to one embodiment. The transportable machine illustrated in FIGS. 1-4 is a sewer cleaning machine 1200. As will be understood, the features shown and described herein with respect to the other embodiments of a transportable machine may be used in combination with the features shown and described with respect to the sewer cleaning machine 1200.

The sewer cleaning machine 1200 includes a frame 1210, a handle 1230, a base 1234, and a track 1226. The frame 1210 defines an elongated body extending between the handle 1230 and the base 1234. Specifically, the handle 1230 is positioned on a top end of the frame 1210 to enable a user to grip and control movement of the sewer cleaning machine 1200. The base 1234 is positioned on a bottom end of the frame 1210 and is configured to support a load, such as a machine or other load, that may be desirable to be able to transport. For example, the base 1234 may be configured to support many of the components of the sewer cleaning machine 1200. In the embodiment illustrated in FIGS. 1-4, the base 1234 supports a drum housing 1214, a motor housing 1218, and a power supply 1222. The track 1226 is supported by the frame 1210 to help facility transport of the sewer cleaning machine 1200. In the illustrated embodiment, the track 1226 is positioned on a rear side of the frame 1210 between the handle 1230 and the base 1234. Additionally, the illustrated sewer cleaning machine 1200 includes wheels 1238 rotatably coupled to the frame 1210 to also assist with transport of the sewer cleaning machine 1200.

In the illustrated embodiment, a drum 1242 is rotatably supported within the drum housing 1214 and includes a cable (not shown in FIGS. 1-4) that is extendable out of an opening 1246 on the drum 1242. In some embodiments, the drum 1242 is a cage-style drum that when the drum housing 1214 is opened allows easy access to the cable so a user can inspect the cable. The cable is extendable out of the drum with a cable feed device 1250. A first motor 1254 is supported within the motor housing 1218 and is coupled to the drum 1242. The first motor 1254 is operable to rotate the drum 1242. Rotation of the drum 1242 creates friction between an inner surface of the drum 1242 and the cable, which causes the cable to spin to facilitate clearing debris from a drain pipe or another conduit.

The track 1226 is configured to engage a surface, such as stairs or a ramp to help a user maneuver the sewer cleaning machine 1200. In the illustrated embodiment, the track 1226 is positioned on the opposite side of the frame 1210 as the drum 1242. For example, the drum 1242 is positioned on a front side of the frame 1210, and the track 1226 is positioned on a back side of the frame 1210. In other embodiments the track 1226 can be positioned on either the left or right side of the frame 1210.

The track 1226 includes a substantially horizontal drive shaft 1258 with a first drive roller 1262 at one end and a second drive roller 1266 at another end. A first endless belt 1270 extends around the first drive roller 1262 and a first idler roller 1274, and a second endless belt 1278 extends around the second drive roller 1266 and a second idler roller 1282. The endless belts 1270, 1278 extend substantially vertically along a length of the frame 1210. In some embodiments, the track 1226 may only include a first endless belt 1270 and respective rollers 1262, 1274 rather than including first and second endless belts 1270, 1278. In some embodiments, the endless belts 1270, 1278 include traction elements that assists in gripping a surface, ledge, or other object. For example, in the illustrated embodiment, the endless belts 1270, 1278 include castellations 1276, or projections, that help grip various surfaces. In further embodiments, the endless belts 1270, 1278 include replaceable cleats that can be replaced when worn down instead of replacing the entire track 1226. In other embodiments, the track 1226 can articulate or expand and retract to better climb stairs.

Figure 3:
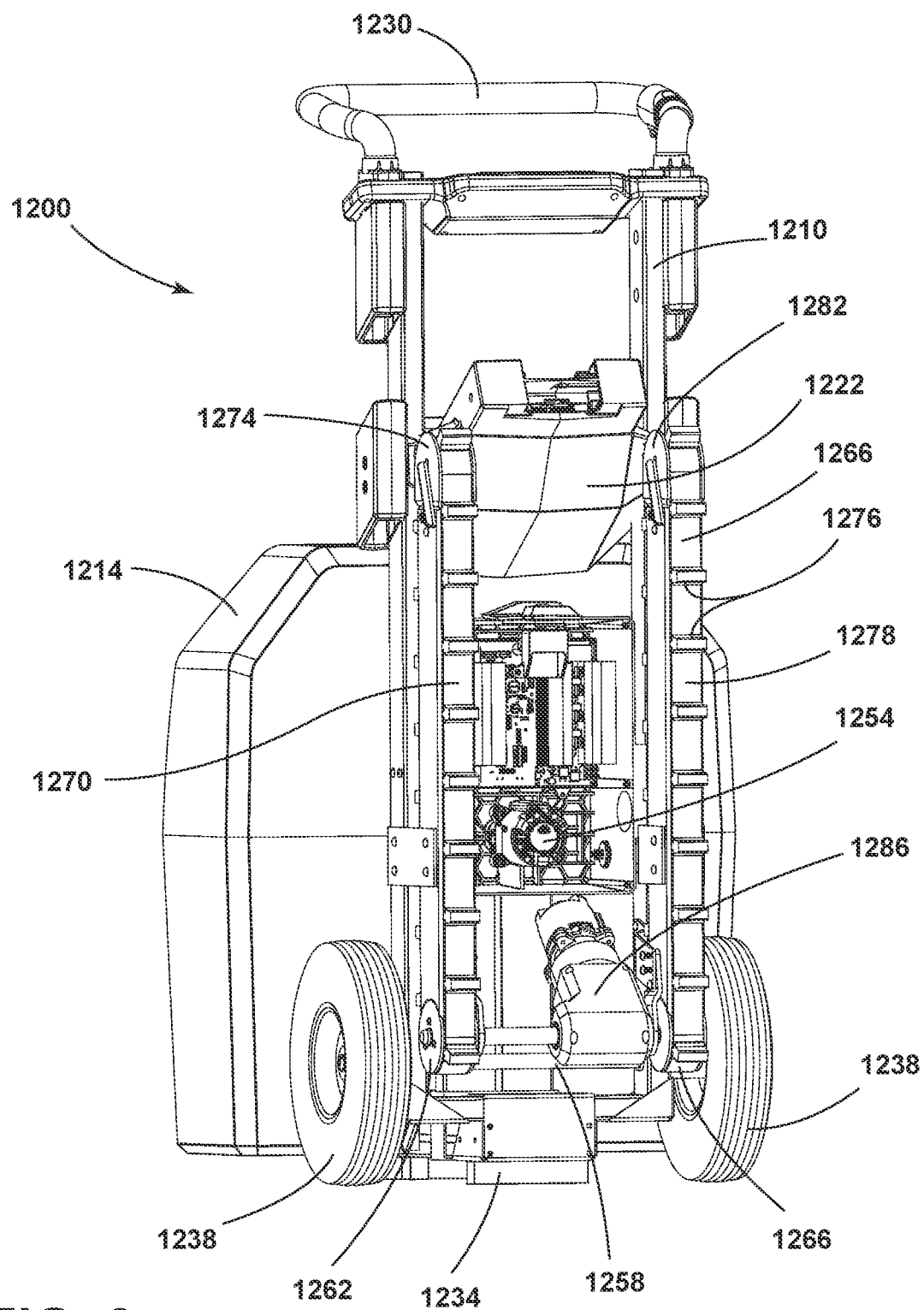
FIG. 3 is a rear perspective view of the transportable machine of FIG. 1 with a motor housing removed.
Figure 4:
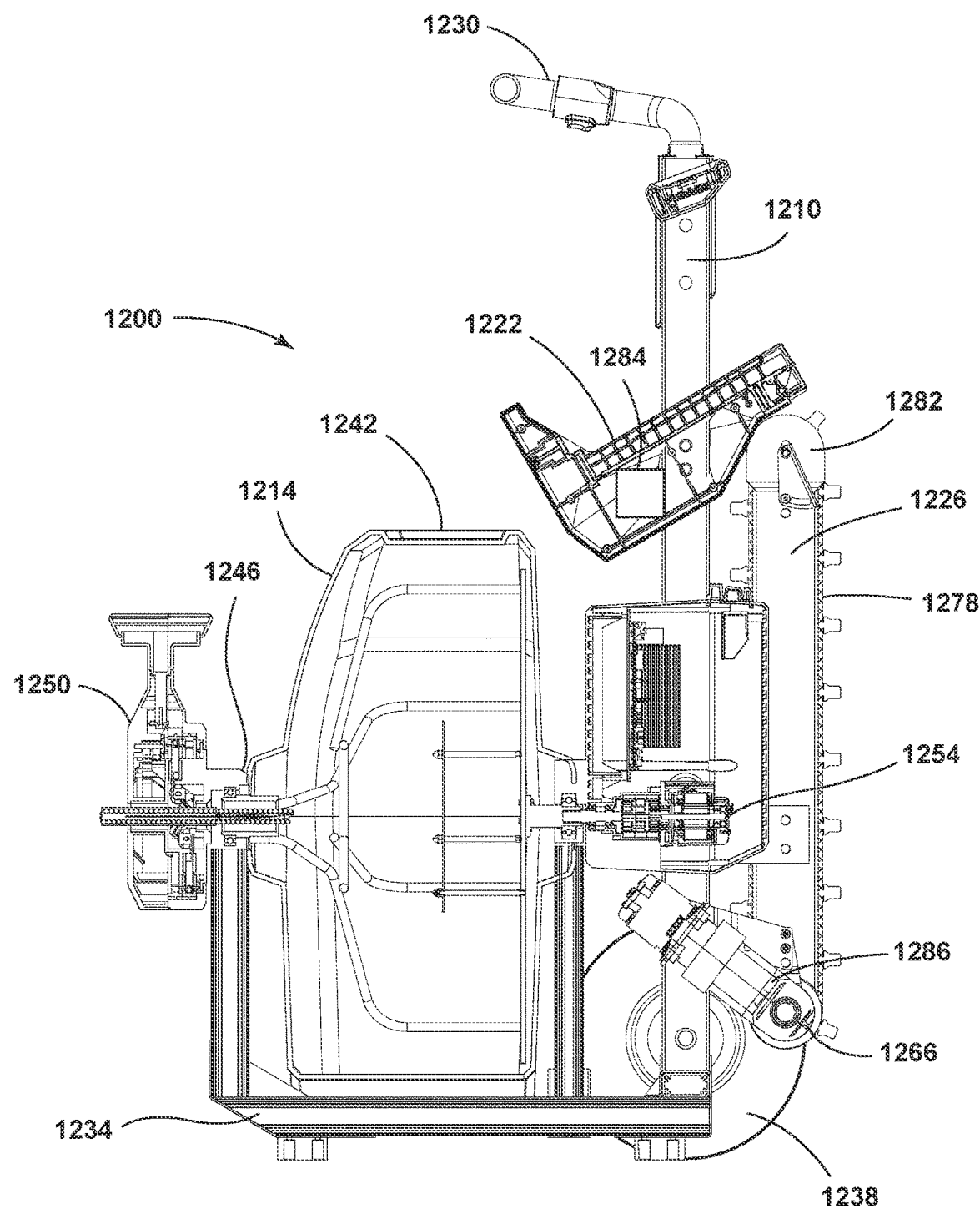
FIG. 4 is a cross-sectional view of the transportable machine of FIG. 1.

As shown in FIG. 3, a second motor 1286 is supported by the frame 1210 and is coupled to the drive shaft 1258 of the track 1226. The second motor 1286 is operable to rotate the drive shaft 1258 and thus the drive rollers 1262, 1266 to facilitate rotation of the endless belts 1270, 1278. In other embodiments, the track 1226 is passively driven rather than motor driven. For example, the endless belts 1270, 1278 of the track 1226 may be rotated by engagement with a surface, such as stairs or a ramp, as a user pulls the sewer cleaning machine 1200. Regardless of whether the track 1226 is motor driven or passively driven, the track 1226 is decoupled from the drum 1242 in that the track 1226 is independently rotated without affecting the rotation of the drum 1242.

In the illustrated embodiment, both the first and second motors 1254, 1286 are powered by the power supply 1222 that is supported on the frame 1210. The first and second motors 1254, 1286 are, for example, brushless motors. In additional embodiments, the first and second motors 1254, 1286 are variable two speed motors. In the illustrated embodiment, the power supply 1222 includes a battery receptacle that receives a battery pack to provide D/C power to the sewer cleaning machine 1200. For example, the battery receptacle may removably receive a rechargeable power tool battery pack. In further embodiments, the power supply 1222 may receive more than one battery pack to power the sewer cleaning machine 1200. In alternative embodiments, the power supply 1222 may be coupled to a power outlet to provide A/C power to the sewer cleaning machine 1200.

The power supply 1222 is electrically coupled to a controller 1284 that may control operation of the first and second motors 1254, 1286. In some embodiments, the controller 1284 ensures that when one motor is operating the other motor is locked out and cannot be run. As previously mentioned, the track 1226 is decoupled from the drum 1242 such that rotation of one is independent of the other. In some embodiments, the controller 1284 actively decouples the track 1226 from the drum 1242 so that they cannot operate at the same time. In other embodiments, the track 1226 is decoupled from the drum 1242 only by lack of mechanical connection to the drum 1242. Additionally, the sewer cleaning machine 1200 may include switches, buttons, a user interface, or other control features that allow a user to selectively control the sewer cleaning machine 1200.

Further, the power supply 1222 or the battery may include a battery fuel gauge to indicate to a user how much longer the battery will last. Additionally, the sewer cleaning machine 1200 may include battery detection that indicates to a user if the sewer cleaning machine 1200 has enough power to climb a standard set of stairs and, if not, lock out the tracks 1226 from being operated. This inhibits a user from initiating a stair climb and then running out of power in the middle of the stairs where it is difficult to manually maneuver the sewer cleaning machine 1200.

Figure 6:
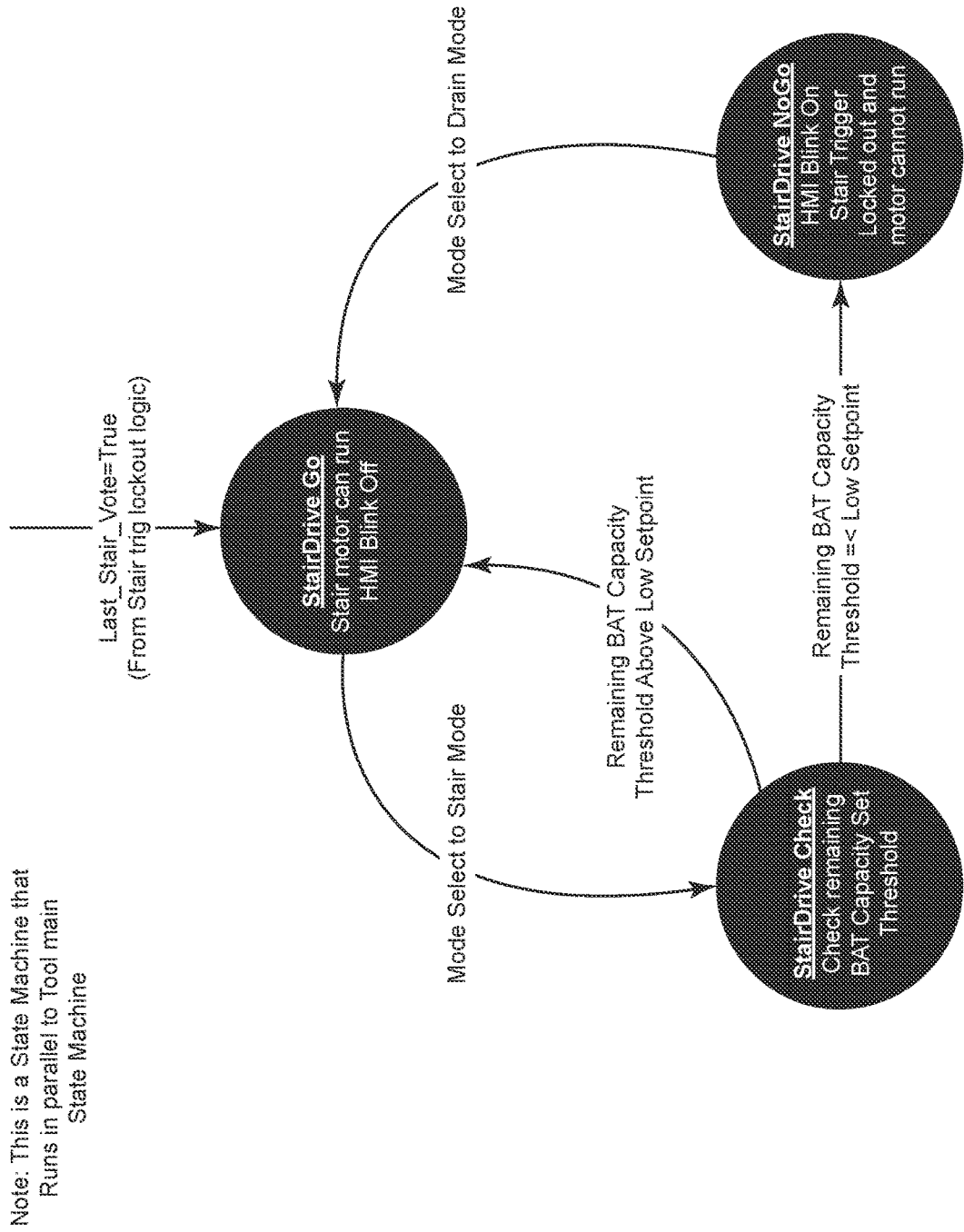
FIG. 6 is a flow chart of a stair-drive check.
Figure 7:
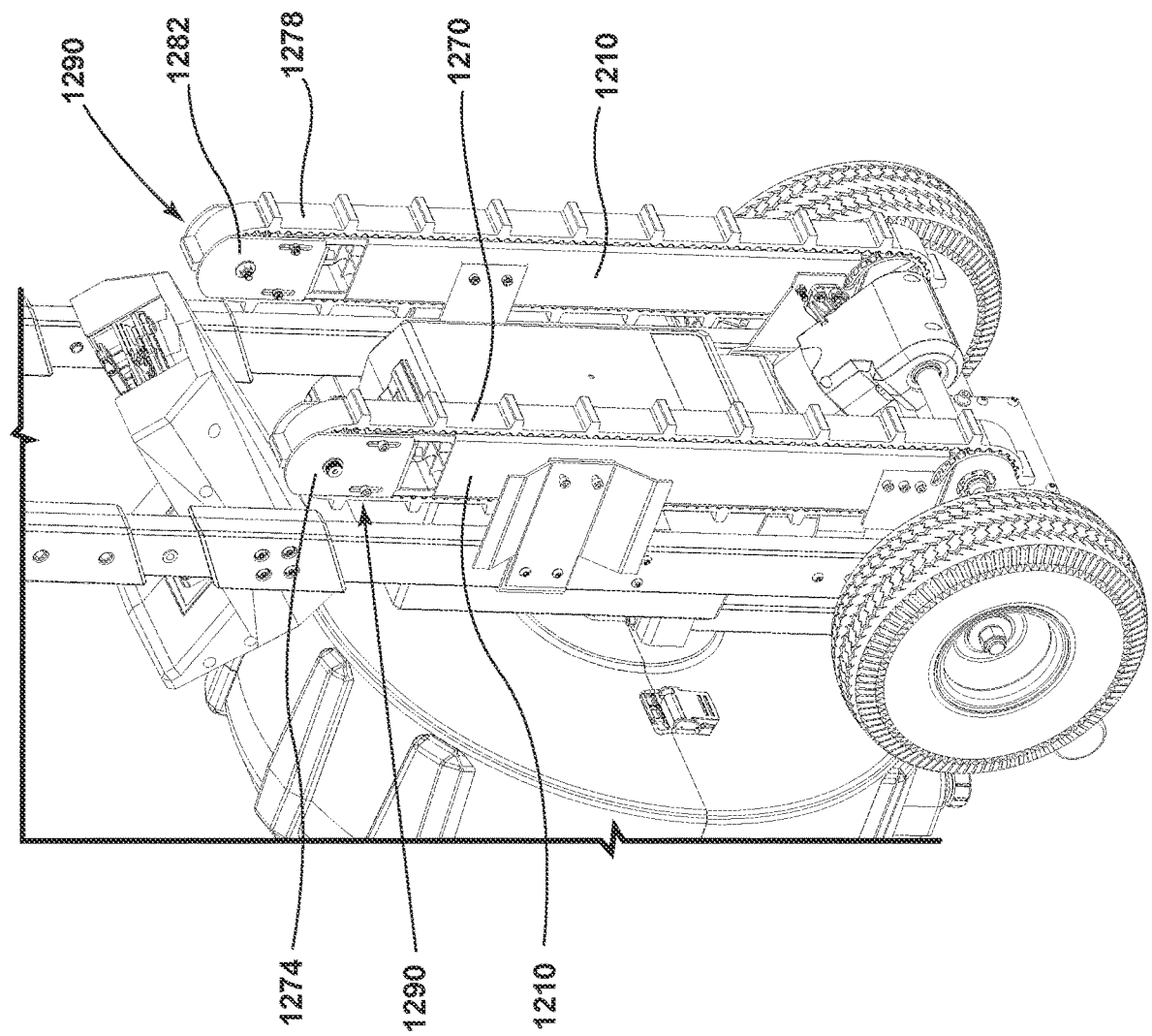
FIG. 7 is a perspective view of a transportable machine with a belt tensioning mechanism according to one embodiment.
Figure 8:
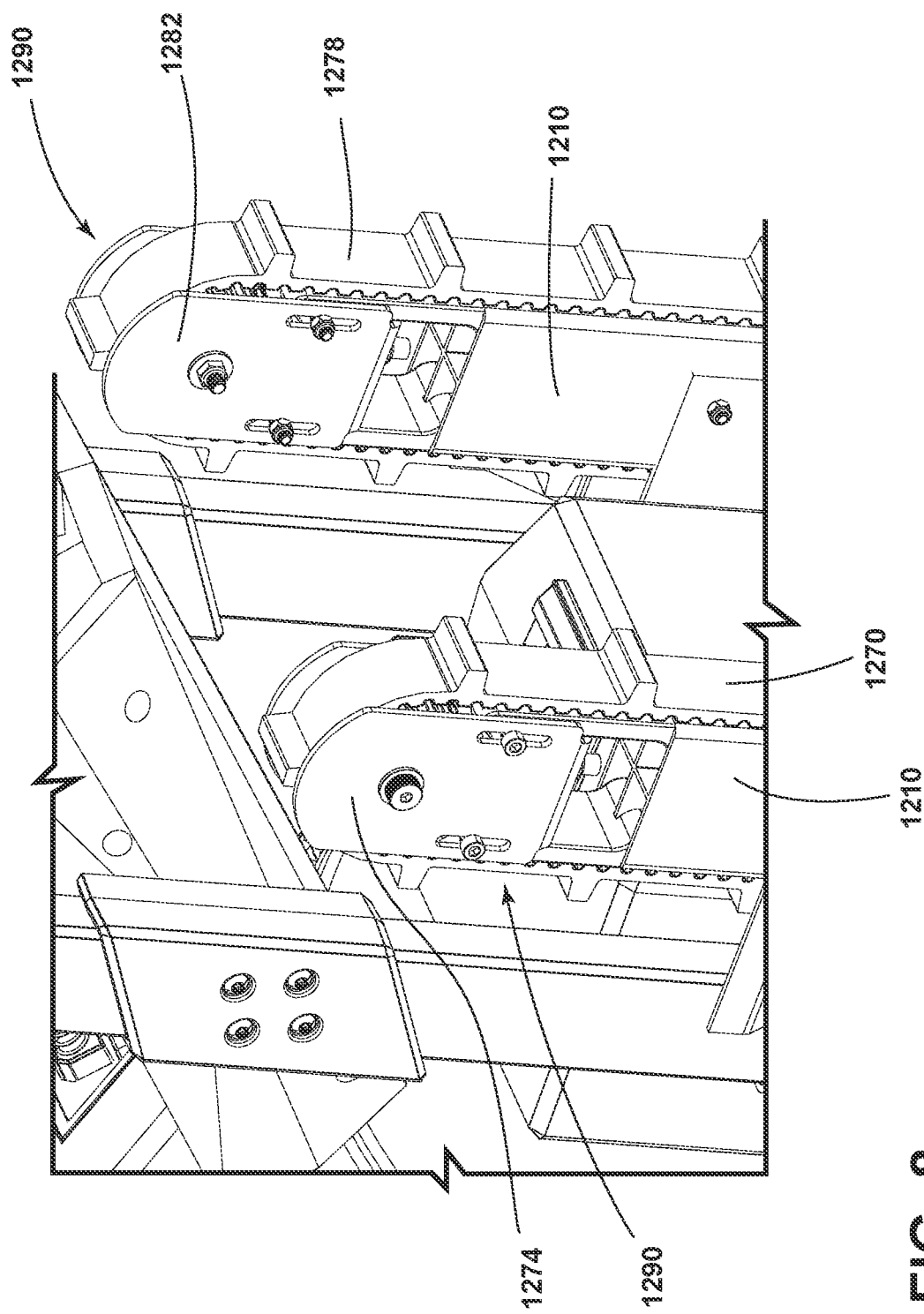
FIG. 8 is a perspective view of the belt tensioning mechanism of FIG. 7.
Figure 9:
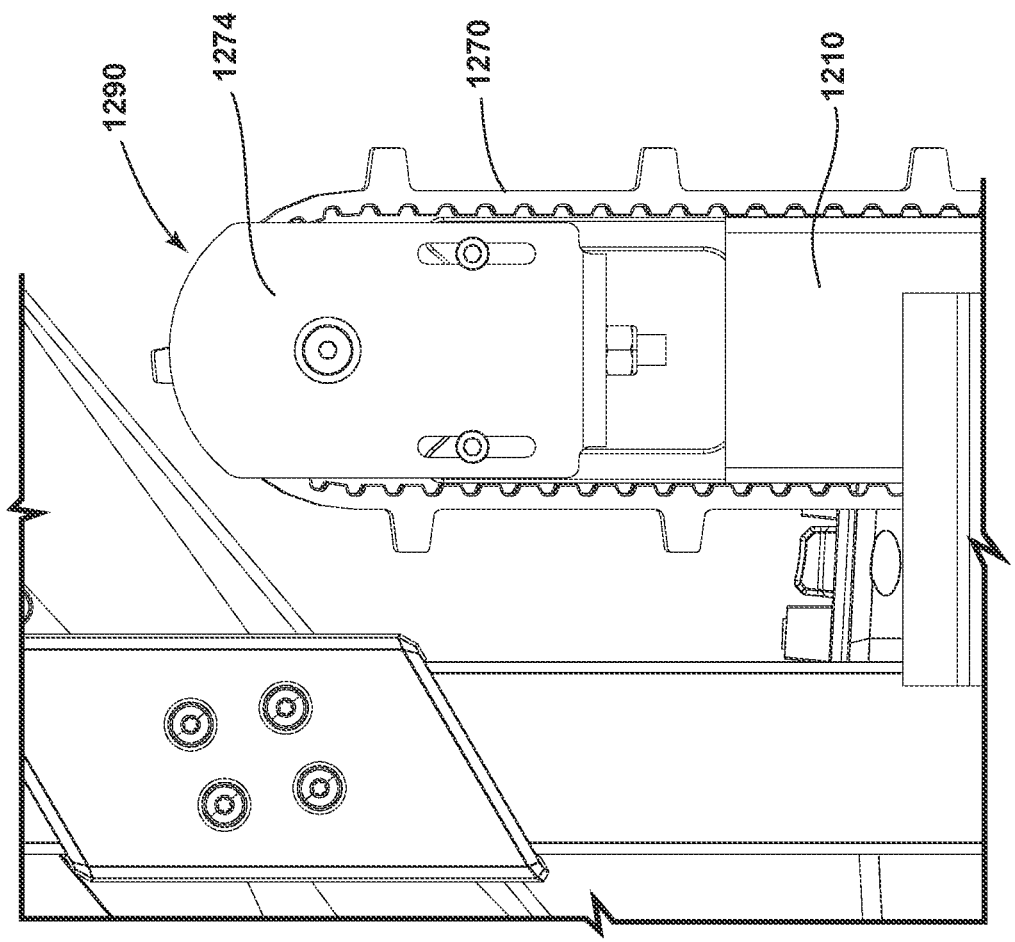
FIG. 9 is a side view of the belt tensioning mechanism of FIG. 7.
Figure 10:
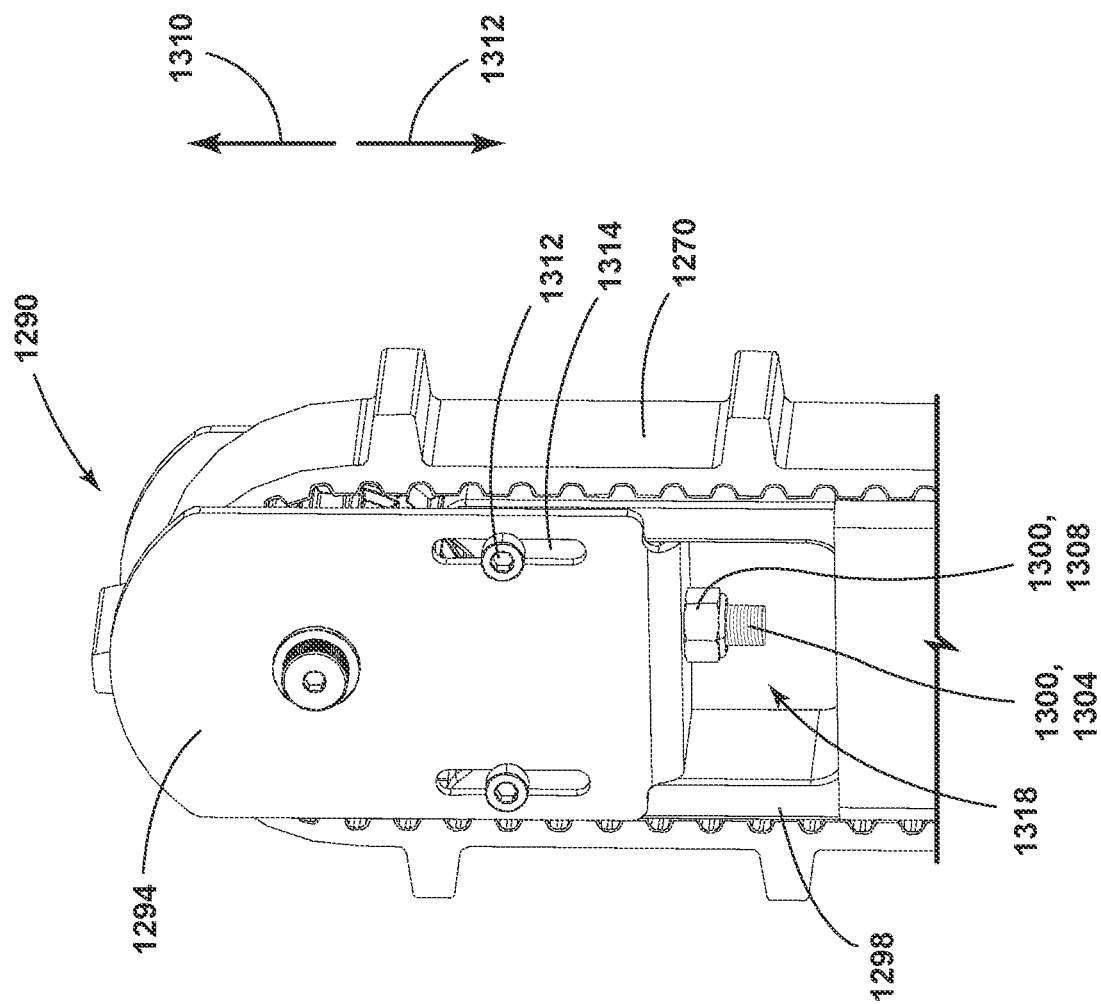
FIG. 10 is an enlarged perspective view of the belt tensioning mechanism.
Figure 11:
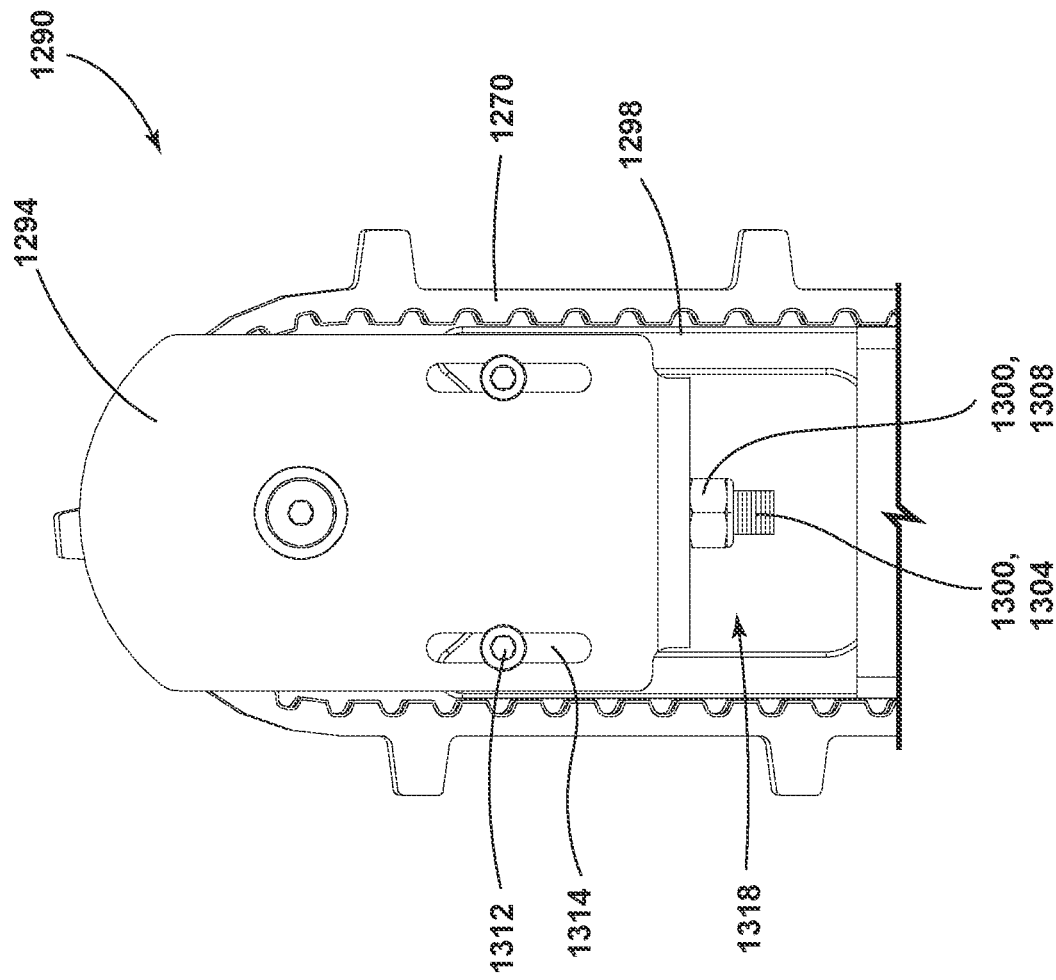
FIG. 11 is an enlarged side view of the belt tensioning mechanism of FIG. 10.
Figure 12:
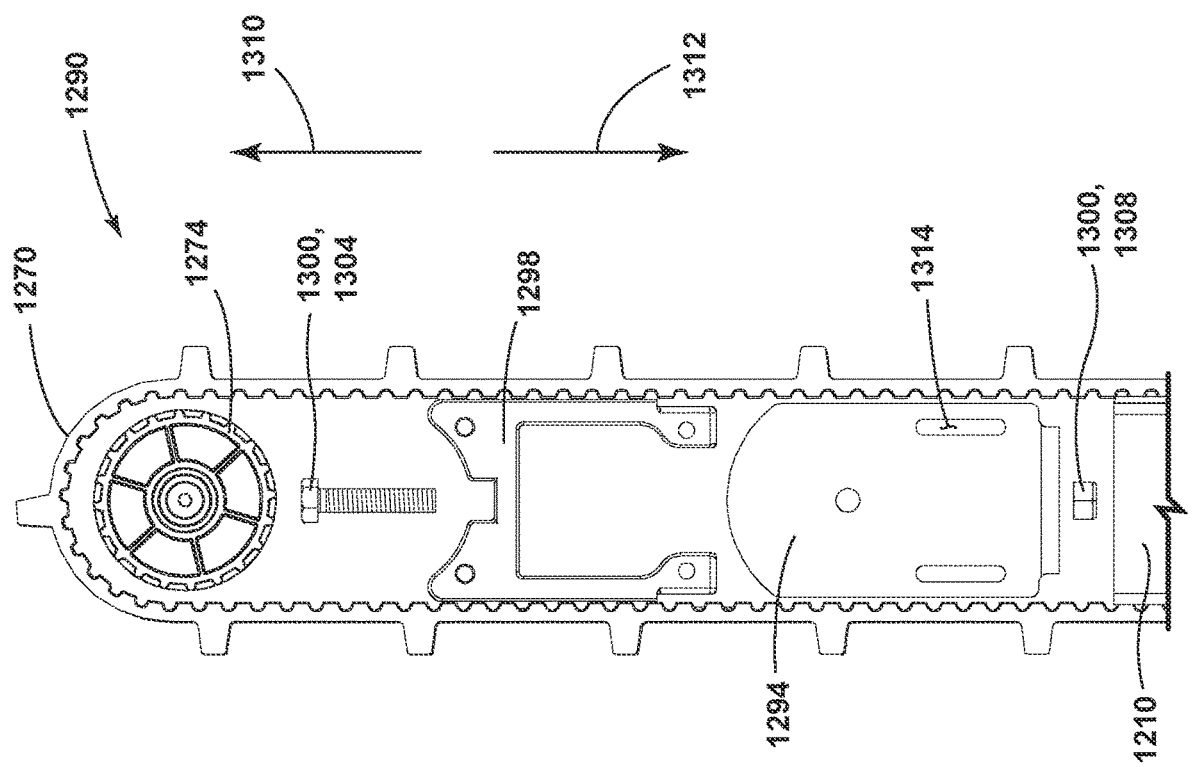
FIG. 12 is an exploded view of the belt tensioning mechanism of FIG. 10.

Referring to FIG. 6, a user can adjust the sewer cleaning machine 1200 from a drain cleaning mode, in which the drum 1242 is operable, to a stair climbing mode, in which the track 1226 is operable. When the user adjusts the sewer cleaning machine to the stair climbing mode, the control system of the sewer cleaning machine 1200 initiates a stair-drive check to determine whether the power supply 1222 has sufficient power to climb a set of stairs. When the remaining capacity of the power supply 1222 is sufficient to climb an entire set of stairs, the system will allow the second motor 1286 to power the track 1226 and enable the sewer cleaning machine 1200 to climb a set of stairs. Specifically, when the capacity of the power supply 1222 is above a predetermined threshold, the track 1226 is operable to climb the stairs. When the remaining capacity of the power supply 1222 is insufficient to climb an entire set of stairs, the system enters a lock out mode and prevents the second motor 1286 from powering the track 1226. Specifically, when the capacity of the power supply 1222 is below a predetermined threshold, the track 1226 is locked out. Alternatively, when the remaining power supply 1222 is insufficient to climb an entire set of stairs, the system provides an alert to the user indicating that the battery power is insufficient to client the entire set of stairs. In this embodiment, the user may have the option to continue to utilize the track 1226 in a driven mode until the power supply 1222 is completely depleted and then may climb the remaining stairs using the track 1226 in an idle mode.

The predetermined threshold can be determined based on a standard height of a set of stairs. In some embodiments, the predetermined threshold can be determined based on a variety of different sized stair sets, such as a half stair well or an extra long stair well. When the sewer cleaning machine 1200 enters the lock out mode, an indicator informs the user that there is insufficient battery to complete the stair climb. The indicator may include, for example, a light on the sewer cleaning machine 1200 and/or an audible alert. The user may then charge the power supply 1222 or swap battery packs so that the capacity exceeds the predetermined threshold. When the sewer cleaning machine 1200 is in the locked out mode, a user has the option to adjust the sewer cleaning machine back to a drain cleaning mode. Although the power supply may not be sufficient to initiate a stair climb, the drum 1242 may still be operated when the capacity of the power supply 1222 is below the predetermined threshold.

Referring back to FIGS. 2-4, the sewer cleaning machine 1200 is shown in a first operational position. In this position, the drum housing 1214 of the sewer cleaning machine 1200 is supported on a surface to facilitate the clearing of debris from a conduit. In operation, the power supply 1222 supplies power to the first motor 1254 to spin the drum 1242. The cable feed device 1250 draws cable from inside the drum 1242 so that a user may extend the cable into a drain. Rotation of the drum 1242 causes the cable to spin, assisting in the removal of debris from the drain.

Figure 5:
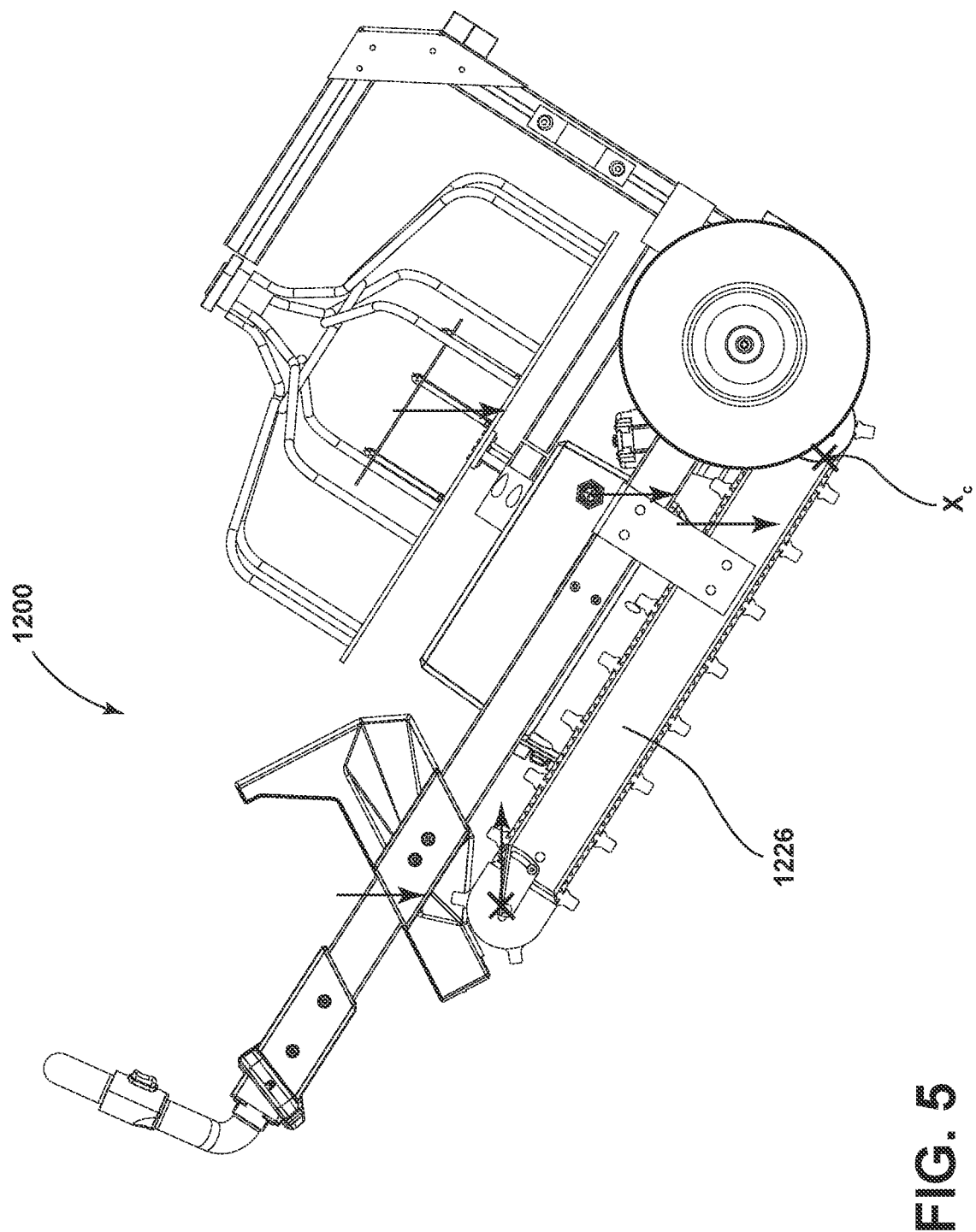
FIG. 5 is a side view of a frame of the transportable machine of FIG. 1.

With reference to FIGS. 1 and 5, the sewer cleaning machine 1200 is shown in a second transport position. A user may tilt the frame 1210, lifting the housing 1214 off of a surface and allowing the wheels 1238 to transport the sewer cleaning machine 1200 along the surface. However, due to the weight, the sewer cleaning machine 1200 may be difficult to lift. Specifically, a user may have difficulty transporting the sewer cleaning machine 1200 on stairs. During transportation, the track 1226 may assist in lifting the sewer cleaning machine 1200 both up and down stairs. A user may first position the sewer cleaning device 1200 so that the track 1226 engages the stairs, for example as shown in FIG. 5. Once the track 1226 engages the stairs, the user can control the power supply 1222 to operate the second motor 1286. The second motor 1286 rotates the drive shaft 1258, thereby rotating the endless belts 1270, 1278. As the endless belts rotate 1270, 1278, the traction on the belts 1270, 1278 assist in pulling the sewer cleaning machine 1200 up the stairs. Meanwhile, the user can also assist by pulling on the handle 1230 of the sewer cleaning device 1200. To transport the sewer cleaning device 1200 down stairs, a user can control the second motor 1286 to rotate the track 1226 in the opposite direction.

With continued reference to FIG. 5, the center of gravity $X_c$ of the sewer cleaning machine 1200 is positioned on the track 1226 while the sewer cleaning machine 1200 is at an angle relative to the ground (i.e., horizontal). In some embodiments, the angle of the sewer cleaning machine 1200 is between approximately 30 and 35 degrees with the horizontal. In other embodiments, the angle of the sewer cleaning machine 1200 is between approximately 32 and 33 degrees with the horizontal. In further embodiments, the angle of the sewer cleaning machine 1200 is 32.47 degrees with the horizontal, which correlates with the standard US code for the angle of stairs. Positioning the center of gravity $X_c$ on the treads reduces the possibility of the sewer cleaning machine 1200 tipping if a user were to release the sewer cleaning machine 1200 while climbing or descending stairs. In some embodiments, when the sewer cleaning machine 1200 is tilted at an angle less than 35 degrees relative to the horizontal, the center of gravity $X_c$ of the sewer cleaning machine may be above the tracks in a vertical direction. In a further embodiment, when the sewer cleaning machine 1200 is tilted at an angle of less than 33 degrees, the center of gravity $X_c$ is above the treads in a vertical direction.

In some embodiments, the sewer cleaning machine 1200 includes a variable speed control that allows for stair climbing at a user selectable speed. For example, the sewer cleaning machine 1200 may travel up a set of stairs at a different speed than traveling down a set of stairs. In some embodiments, the sewer cleaning machine 1200 may travel up the set of stairs faster than the machine 1200 travels down the set of stairs. The user may adjust the speed of the track 1226 to travel up or down a set of stairs at a desired speed. In some embodiments, the controller 1284 is able to automatically control the speed of the track 1226 based on a direction of travel of the sewer cleaning machine 1200. For example, the controller 1284 may determine whether the sewer cleaning machine 1200 is traveling up or down a set of stairs and automatically determine and adjust the desired speed of the track 1226. In some embodiments, the controller 1284 may determine when the track 1226 is rotating a first direction (e.g., clockwise) correlated with traveling up a set of stairs, and thereby increase the speed of the track 1226. Likewise, the controller 1284 may determine when the track 1226 is rotating in a second direction (e.g., counter-clockwise) correlated with traveling down a set of stairs, and thereby decrease the speed of the track 1226. In some embodiments, the user may control or may override the speed of the track 1226 designated by the controller 1284.

With reference to FIGS. 7-12, the track 1226 may include a belt tensioning assembly 1290. In the illustrated embodiment, the track 1226 includes two belt tensioning assemblies 1290, one of each endless belt 1270, 1278. In other embodiments, the track 1226 may include fewer or more belt tensioning assemblies 1290 (depending on the number of belts), or a single belt tensioning assembly may be used for multiple belts. The belt tensioning assemblies 1290 can increase or decrease the tensions of the first endless belt 1270 and the second endless belt 1278. For example, increasing the tension of the belts 1270, 1278 may reduce the possibility of the belts 1270, 1278 slipping during rotation. Increasing the tension of the belts 1270, 1278 may also reduce the possibility of the belts 1270, 1278 derailing from the pulley system. In addition, when the belts 1270, 1278 become worn and need to be replaced, the tension of the belts 1270, 1278 may be decreased in order to more easily remove the old belt and reattach a new belt. One of the belt tensioning assemblies 1290 is described in more detail below. The other belt tensioning assembly 1290 is substantially the same.

The illustrated belt tensioning assembly 1290 includes a bracket 1294, a mount 1298, and an adjustment member 1300. The bracket 1294 is movable relative to the mount 1298. The mount 1298 supports the adjustment member 1300, which helps to position the bracket 1294 relative to the mount 1298. The belt tensioning assembly 1290 is capable of adjusting the position of an idler roller, such as the first idler roller 1274 and the second idler roller 1282 relative to the first endless belt 1270 and the second endless belt 1278, respectively. As described herein, the belt tensioning assembly 1290 will be described with respect to the first idler roller 1274 and first endless belt 1270, however, it should be understood that the same construction can be applied to the second idler roller 1282 and the second endless belt 1278.

The bracket 1294 supports the first idler roller 1274. In particular, the bracket 1294 rotatably supports the first idler roller 1274 such that the first idler roller 1274 is rotatable relative to the bracket 1294. However, the bracket 1294 and the first idler roller 1274 translate together relative to the first endless belt 1270. As such, the bracket 1294 and the first idler roller 1274 can be translated in a first direction 1310 to increase the tension of the first endless belt 1270, and can be translated in a second direction 1312 to decrease the tension of the first endless belt 1270.

The mount 1298 is fixed to a portion of the frame 1210. The bracket 1294, and thus the first idler roller 1274, can translate relative to the mount 1298 in order to tension the first endless belt 1270. Specifically, the adjustment member 1300 is configured to adjust the position of the bracket 1294 and the first idler roller 1274 relative to the mount 1298. In the illustrated embodiment, the adjustment member 1300 is a threaded bolt 1304 and a nut 1308; however, in other embodiments, different types of adjustment members may be used. The nut 1308 can be threaded along the length of the bolt 1304 to adjust the position of the bracket 1294. For example, the bolt 1304 can be threaded in the first direction 1310 along the bolt 1304 to move the bracket 1294 in the first direction 1310 to increase tension in the first idler belt 1270. Similarly, the bolt 1304 can be threaded in the second direction 1312 along the bolt 1304 to move the bracket 1294 in the second direction 1312 to decrease tension in the first idler belt 1270. In addition, in the illustrated embodiment, the mount 1298 includes a pair of posts 1313 that extend through slots 1314 in the bracket 1294 to help align and guide the bracket 1294 as it moves relative to the mount 1298.

In the illustrated embodiment, the nut 1308 can be accessed from both sides of the first endless belt 1270 through a window 1318 formed by the mount 1298. This allows a user to user a wrench to thread the nut 1308 and adjust the tension of the first endless belt 1270, thus reducing the amount of force input by the user.

Figure 13:
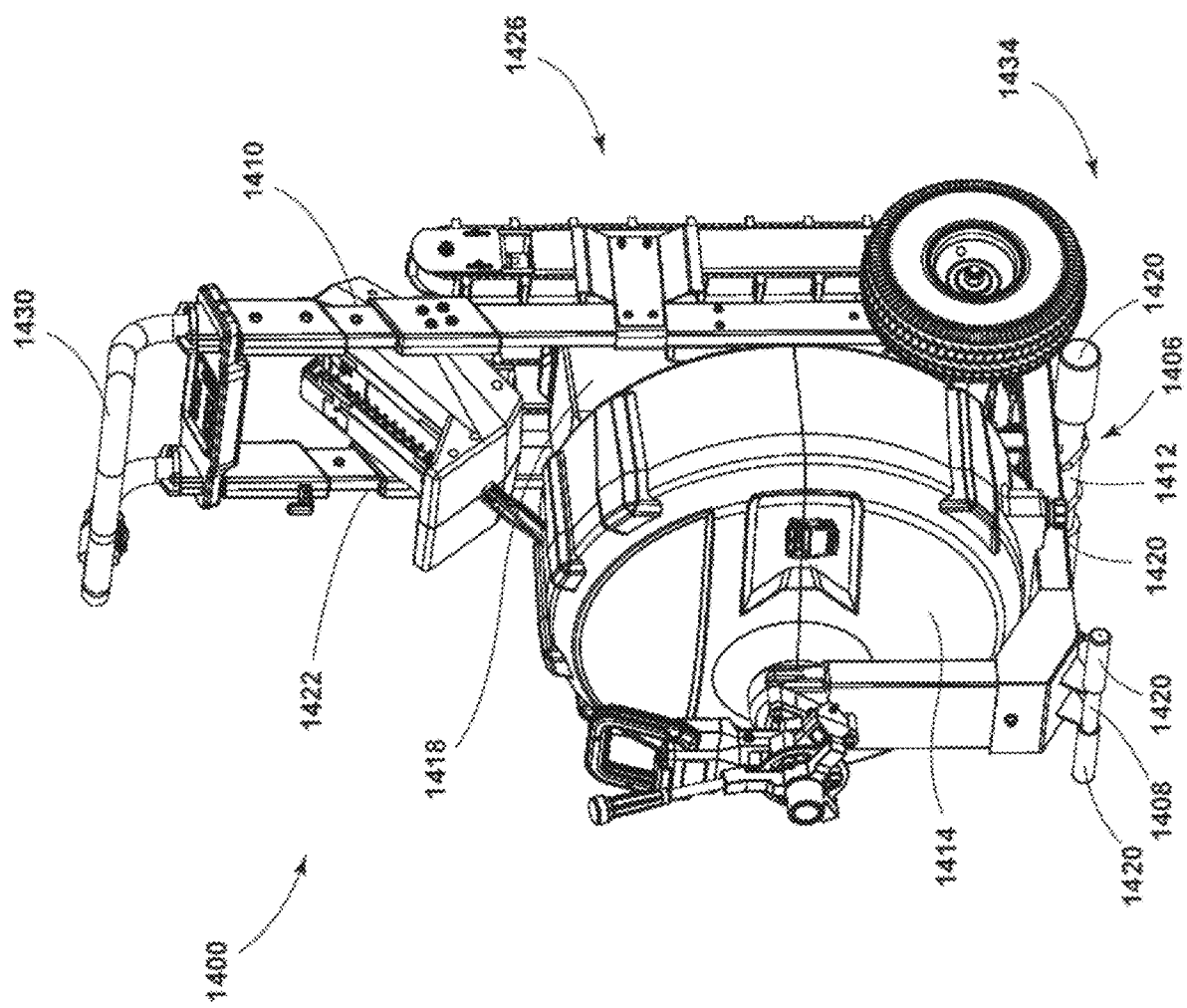
FIG. 13 is a front perspective view of a transportable machine according to another embodiment of the disclosure.

FIG. 13 illustrates a transportable machine according to another embodiment. The transportable machine illustrated in FIG. 13 is a sewer cleaning machine 1400. The sewer cleaning machine 1400 is similar to the sewer cleaning machine 1200 with like features being represented by like reference numerals. As will be understood, the features shown and described herein with respect to the other embodiments of a transportable machine may be used in combination with the features shown and described with respect to the sewer cleaning machine 1400.

The sewer cleaning machine 1400 includes the frame 1410, a handle 1430, a base 1434, and a track 1426. The frame 1410 defines an elongated body extending between the handle 1430 and the base 1434. Specifically, the handle 1430 is positioned on a top end of the frame 1410 to enable a user to grip and control movement of the sewer cleaning machine 1400. The base 1434 is positioned on a bottom end of the frame 1410 and is configured to support a load, such as a machine or other load, that may be desirable to be able to transport. For example, the base 1434 may be configured to support many of the components of the sewer cleaning machine 1400. In the illustrated embodiment, the base 1434 supports a drum housing 1414, a motor housing 1418, a power supply 1422, and a track 1426 that is similar to the track 1226. The track 1426 is supported by the frame 1410 to help facility transport of the sewer cleaning machine 1400. In the illustrated embodiment, the track 1426 is positioned on a rear side of the frame 1410 between the handle 1430 and the base 1434. Additionally, the illustrated sewer cleaning machine 1400 includes wheels rotatably coupled to the frame 1410 to assist in transport of the sewer cleaning machine 1400.

Figure 14:
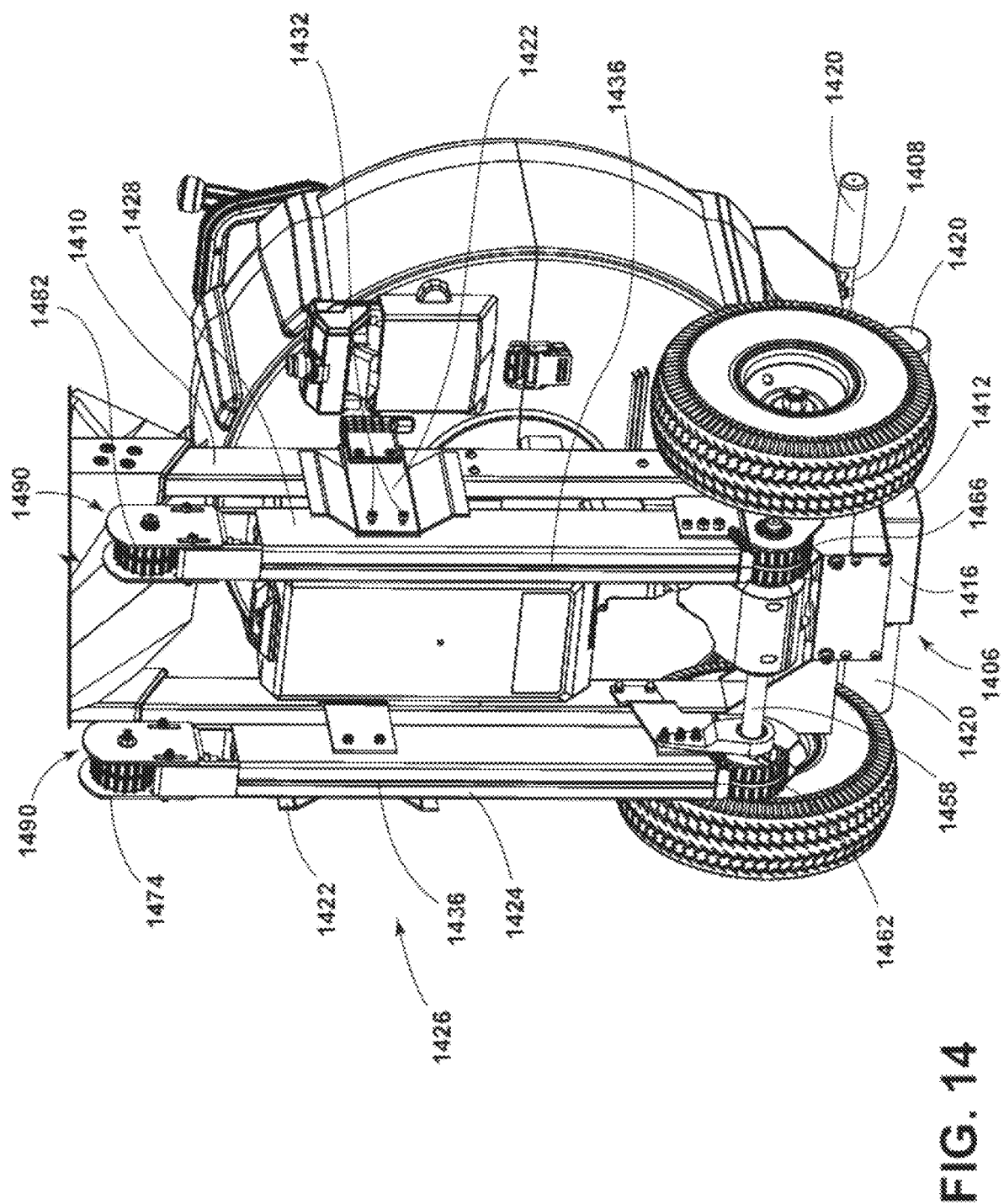
FIG. 14 is a rear perspective view of the transportable machine of FIG. 13 with belts removed.

Moving to FIG. 14, the track 1426 includes a first extrusion 1424 coupled to the frame 1410 and a second extrusion 1428 coupled to the frame 1410 on the opposite side of the drive shaft 1458 as the first extrusion 1424. The first and second extrusions 1424, 1428 each respectively support the first and second drive rollers 1462, 1466, the first and second idler rollers 1474, 1482, the first and second endless belts 1470, 1478 (FIG. 16), and the belt tensioning assemblies 1490. Each of the first and second extrusions 1424, 1428 are coupled to frame 1410 with a bracket 1438 (FIG. 17). The bracket 1438 couples an upper portion of the first and second extrusions 1424, 1428 to the frame 1410. The brackets 1438 are coupled to both the frame 1410 and first and second extrusions 1424, 1428 using fasteners 1450 (FIG. 17) that extend through fastener slots.

Figure 15:
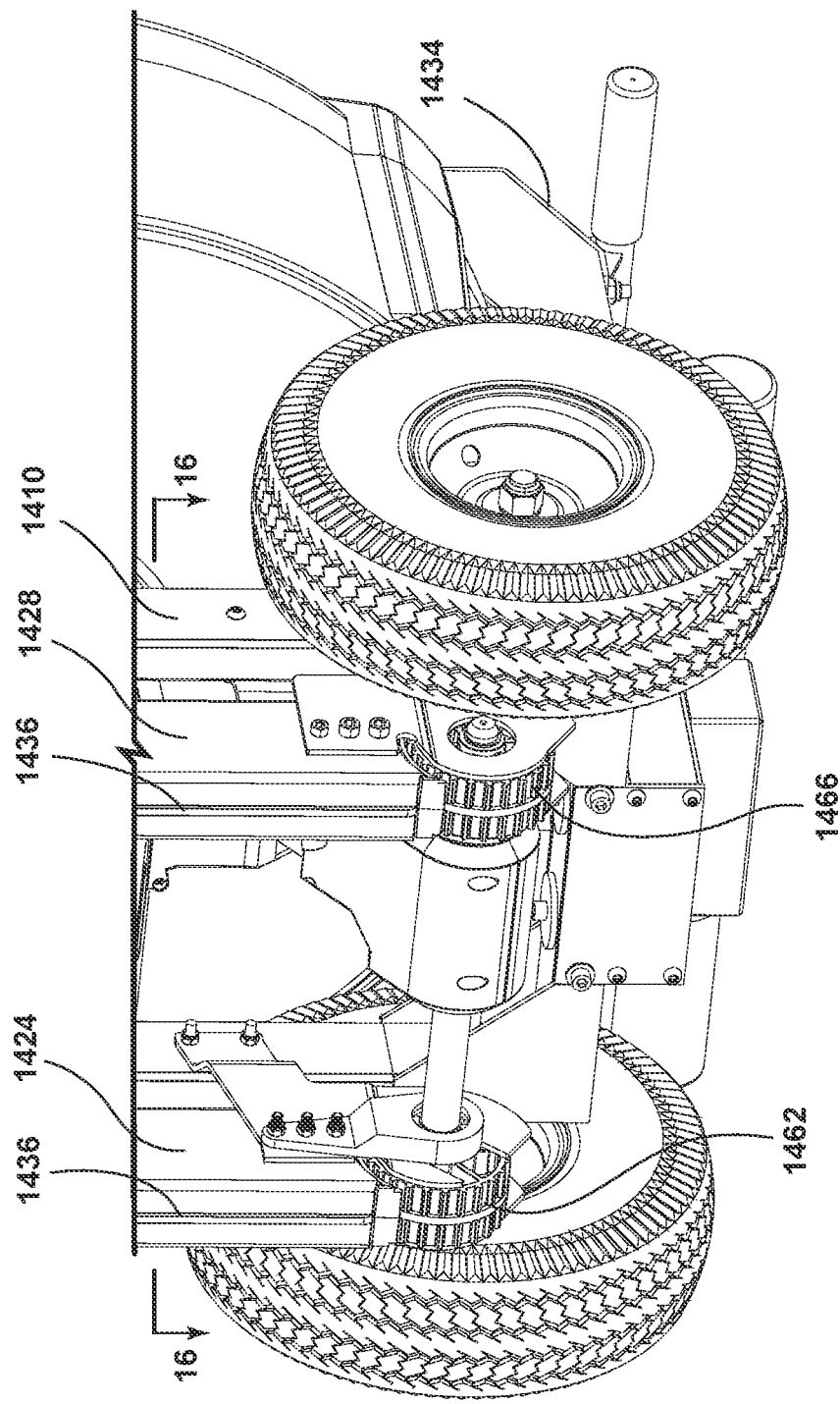
FIG. 15 is an enlarged view of the transportable machine of FIG. 14.
Figure 16:
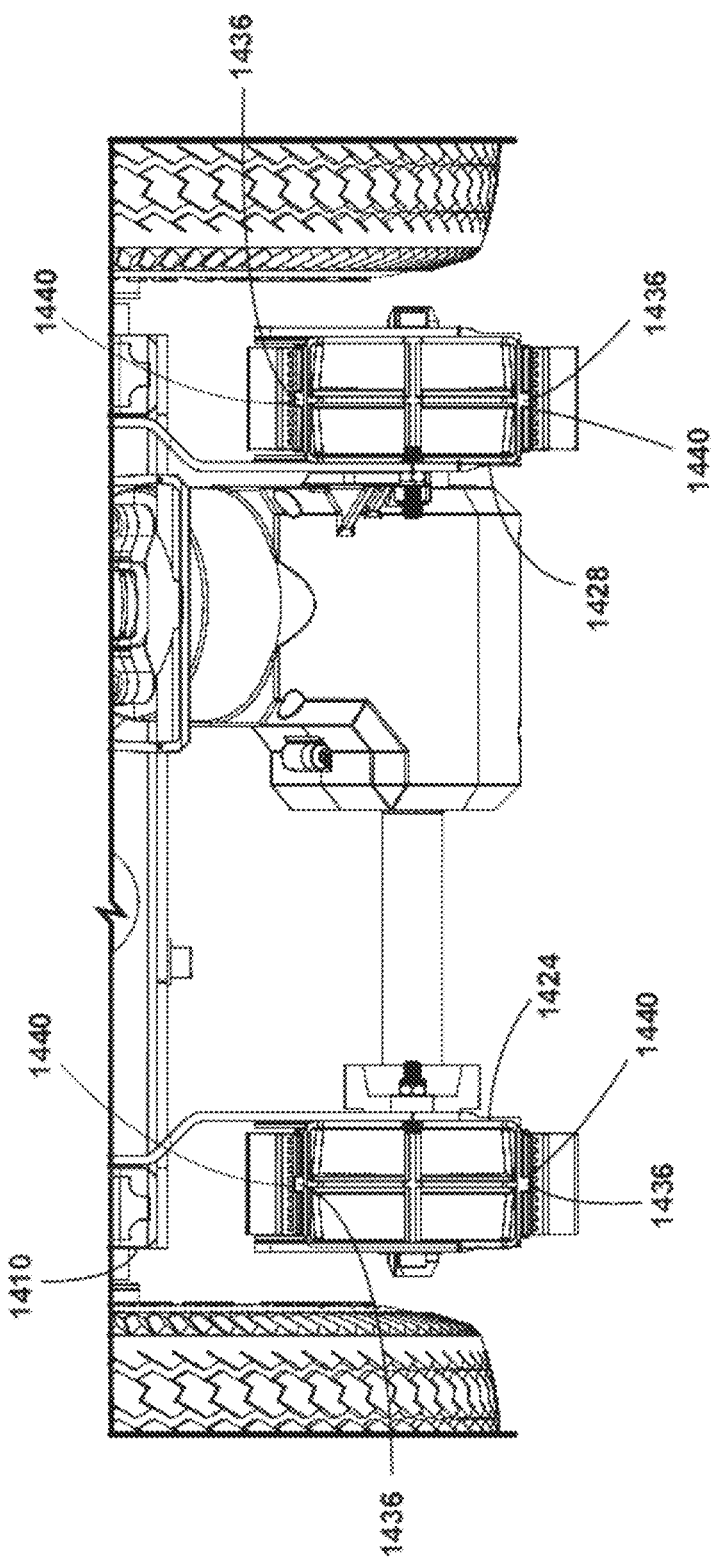
FIG. 16 is a cross-sectional view of the transportable machine of FIG. 15 taken along lines 16-16.
Figure 17:
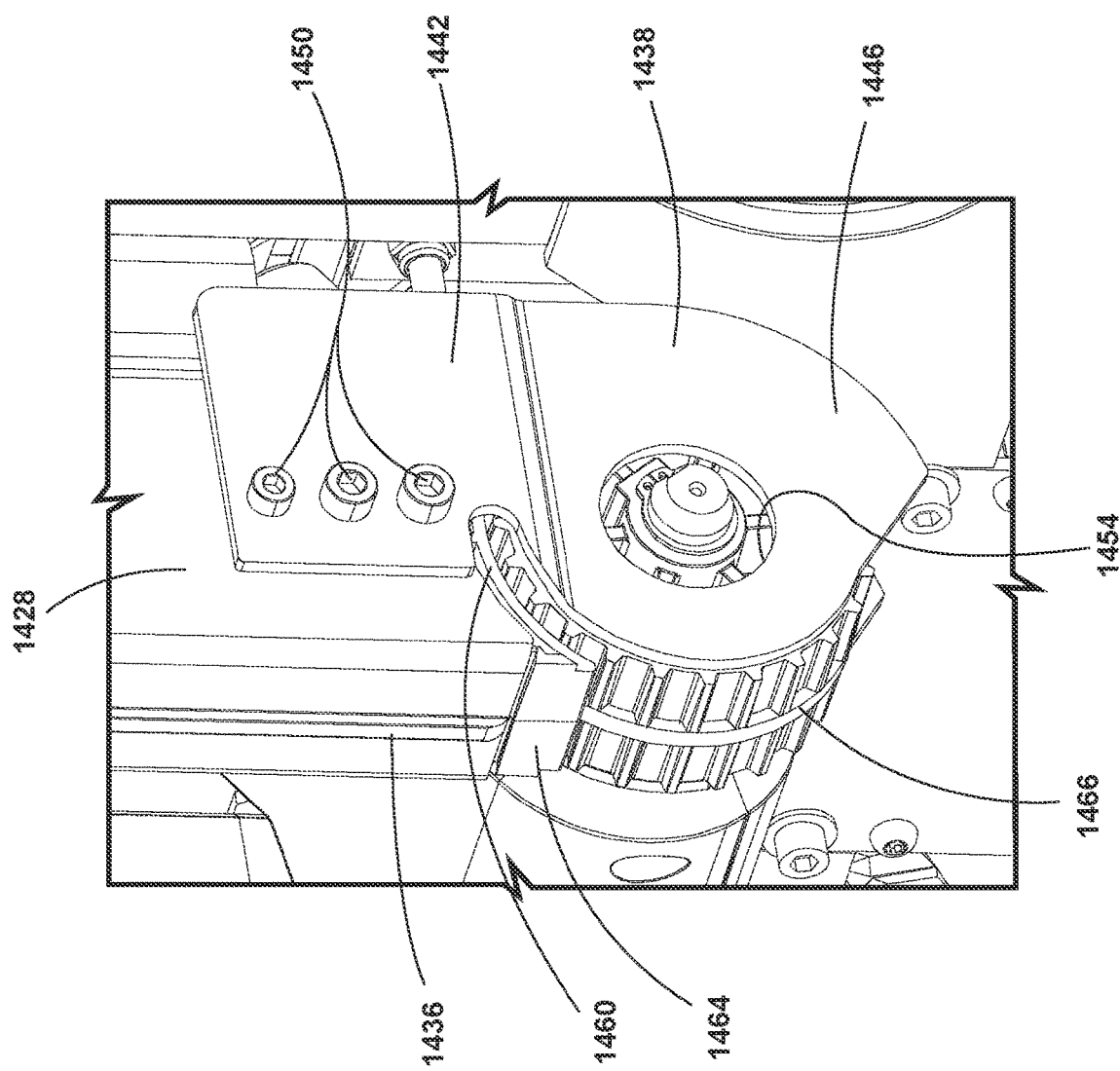
FIG. 17 is a perspective view of a portion of the transportable machine of FIG. 13.

With reference to FIGS. 15 and 16, both the first and second extrusions 1424, 1428 include ribs 1436 that extend the length of the first and second extrusions 1424, 1428 between the idler rollers 1474, 1482 and the drive rollers 1462, 1466. In the illustrated embodiment, a first rib 1436 is on a front side of the first and second extrusions 1424, 1428 facing the frame 1410 and a second rib 1436 is on a back side of the first and second extrusions 1424, 1428 facing away from the frame 1410. The ribs 1436 are generally placed in the center of the first and second extrusions 1424, 1428. The ribs 1436 each correspond to a recess 1440 on the inside of the endless belts 1470, 1478. The ribs 1436 hold the belts 1470, 1478 in place while the belts 1470, 1478 are being rotated. In the illustrated embodiment, each rib 1436 is a continuous projection extending along the length of the corresponding extrusion 1424, 1428. In other embodiments, the ribs 1436 may include discrete projections that only extend along portions of the length of the corresponding extrusion 1424, 1428. In other embodiments, the rib 1436 may only be on one side of the first and second extrusions 1424, 1428. For example, the rib 1436 may only be on a side facing away from the frame 1410 or only on a side facing the frame 1410.

As seen in FIG. 17, the track 1426 further includes a bracket 1438 coupled to the outside of each of the first and second extrusions 1424, 1428. The bracket 1438 includes a flange portion 1442 and a circular portion 1446. The flange portion 1442 includes fastener holes for fasteners 1450 to extend through and couple the bracket 1438 to the respective extrusion 1424, 1428. The flange portion 1442 extends past the respective extrusion 1424, 1428 towards the frame 1410. The portion of the flange portion 1442 that extends past the first and second extrusions 1424, 1428 keeps the belts 1470, 1478 from slipping or jumping off the first and second extrusions 1424, 1428 during operation of the track 1426. Each circular portion 1446 includes an opening 1454 adjacent the respective drive rollers 1462, 1466 to protect the drive rollers 1462, 1466 and provide support to the drive rollers 1462, 1466 during operation of the track 1426.

With continued reference to FIG. 17, an inner support 1460, or guide block, is supported on the inside of each of the first and second extrusions 1424, 1428. The fasteners 1450 used to couple the brackets 1438 to the first and second extrusions 1424, 1428 are also used to support the inner supports 1460 within the first and second extrusions 1424, 1428. Each inner support 1460 includes an outer surface 1464 that extends from within the first and second extrusions 1424, 1428. The outer surface 1464 is generally aligned with or flush with an adjacent outer surface of the corresponding extrusion 1424, 1428. The outer surface 1464 assists the belts 1470, 1478 in transitioning from the first and second extrusions 1424, 1428 to the cleats of the drive rollers 1462, 1466. An inner surface of the inner support 1460 is curved or arcuate to match the curvature of the corresponding drive roller 1462, 1466. As such, the inner support 1460 can be positioned close to, but not interfere with the corresponding driver roller 1462, 1466.

Figure 18:
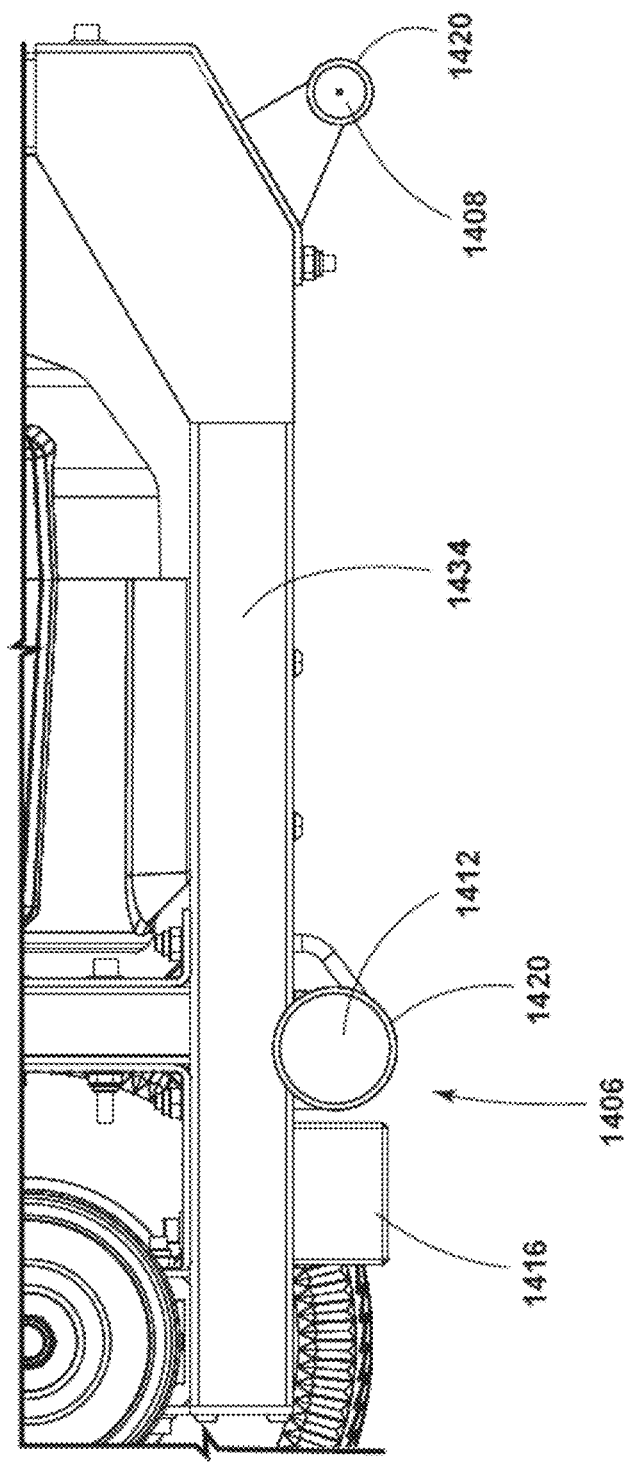
FIG. 18 is a side view of a portion of the transportable machine of FIG. 13.

With reference to FIGS. 13, 14, and 18, the sewer cleaning machine 1400 further includes a support system 1406. The support system 1406 helps stabilize the sewer cleaning machine 1400 when in the upright position. The support system 1406 includes a first stationary kickstand 1408, a second stationary kickstand 1412, and a tilt block 1416 (FIG. 14). The first and second kickstands 1408, 1412 and the tilt block 1416 are generally supported beneath the frame 1410 when the sewer cleaning machine 1400 is in the upright position. In some embodiments, the support system 1406 may be considered part of the frame 1410 of the sewer cleaning machine 1400. The first and second kickstands 1408, 1412 are generally tubular and are fixed relative to the frame 1410. The first kickstand 1408 is generally positioned in front of the drum housing 1414 underneath the feed device 1250. The second kickstand 1412 is positioned behind the drum housing 1414. Both the first and second kickstands 1408, 1412 include rubber ends 1420 to inhibit the sewer cleaning machine 1400 from moving when in the upright position. The tilt block 1416 is positioned behind the second kickstand 1412 relative to the drum housing 1414. The tilt block 1416 may be solid to add weight to the support system 1406. The tilt block 1416 inhibits the sewer cleaning machine 1400 from tipping backwards when a cable is removed from the drum housing 1414 and the sewer cleaning machine 1400 is back heavy.

In some embodiments, the sewer cleaning machine 1400 may include a pop-up wheel or bracket. The pop-up wheel or bracket may be activated to inhibit the sewer cleaning machine from falling down a flight of stairs if a user were to accidentally lose control or hold of the sewer cleaning machine 1400 while climbing stairs. Additionally, the pop-up wheel or bracket may be extended in between climbing steps of a flight of stairs to help support the sewer cleaning machine and inhibit the sewer cleaning machine from tipping backwards or forward. The pop-up wheel may be activated either manually or with a spring release to extend from under the frame 1410 of the sewer cleaning machine 1400. In this way, when there is a pause in stair climbing the frame 1201 would rest on the pop-up bar or bracket that is supported by the previous step.

FIGS. 19-24 illustrate a transportable machine according to another embodiment of the disclosure. The transportable machine illustrated in FIGS. 19-24 is a dolly or hand truck 2010. The hand truck 2010 includes structure similar to the sewer cleaning machines 1200, 1400 of the previous embodiments with like features being represented by like reference numerals. As will be understood, the features shown and described herein with respect to the other embodiments of a transportable machine may be used in combination with the features shown and described with respect to the hand truck 2010.

The hand truck 2010 includes a frame 2210, a handle 2230, a base 2234, and a track 2226. The frame 2210 defines an elongated body extending between the handle 1430 and the base 2234. Specifically, the handle 1430 is positioned on a top end of the frame 2210 to enable a user to grip and control movement of the hand truck 2010. The base 2234 is positioned on a bottom end of the frame 2210 and is configured to support a load, such as a machine or other load, that may be desirable to be able to transport. For example, the base 2234 may be configured to support a machine, tools, cargo, building materials, or other heavy items that may be difficult to transport. In the illustrated embodiment, the base 2234 includes a loading plate member 2040. The loading plate member 2040 and the frame 2210 cooperatively define a space 2044 configured to receive and support a load (e.g., boxes, furniture, appliances, power tools, other goods, and the like) on the hand truck 2010. The track 2226 is supported by the frame 2210 to help facility transport of the hand truck 2010. In the illustrated embodiment, the track 2226 is positioned on a rear side of the frame 2210 between the handle 2230 and the base 2234. Additionally, the illustrated hand truck 2010 includes wheels 2238 rotatably coupled to the frame 2210 to assist in transport of the hand truck 2010.

The track 2226 is configured to engage a surface, such as stairs or a ramp to help a user maneuver the hand truck 2010. In the illustrated embodiment, the track 2226 is positioned on the opposite side of the frame 2210 as the space 2044. For example, the space 2044 is defined on a front side of the frame 2210, and the track 2226 is positioned on a back side of the frame 2210. The track 2226 includes a substantially horizontal drive shaft having a first endless belt 2270 that extends around a first drive roller and a first idler roller, and a second endless belt 2278 that extends around the second drive roller and a second idler roller. The endless belts 2270, 2278 extend substantially vertically along a length of the frame 2210. A motor 2286 (FIG. 20) is supported by the frame 2210 and is coupled to the drive shaft of the track 2226. The motor 2286 is operable to rotate the drive shaft and thus the drive rollers to facilitate rotation of the endless belts 2270, 2278. The motor 2286 is powered by a power supply 2222 that is supported on the frame 2210. In some embodiments, the endless belts 2270, 2278 include traction elements that assists in gripping a surface, ledge, or other object.

Figure 24:
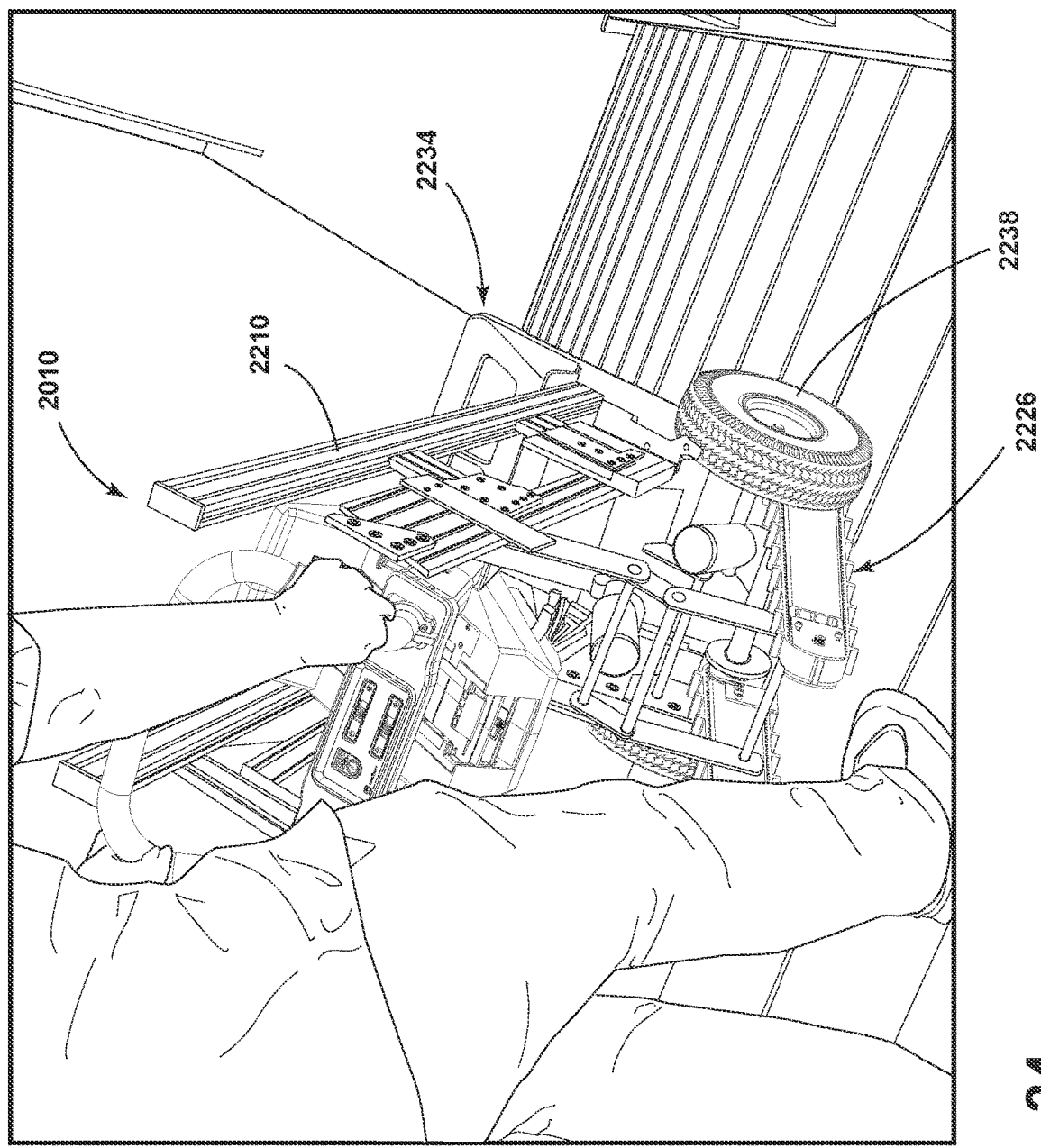
FIG. 24 is a perceptive view of the transportable machine of FIG. 19, illustrating movement of the transportable machine by a user relative to stairs.

A user may tilt the frame 2210, lifting the loading plate member 2040 off of a surface and allowing the wheels 2238 to transport the hand truck 2010 along the surface. However, due to the weight, the hand truck 2010 may be difficult to lift. Specifically, a user may have difficulty transporting the hand truck 2010 on stairs or into a truck bed. During transportation, the track 2226 may assist in lifting the hand truck 2010 both up and down stairs. A user may first position the hand truck 2010 so that the track 2226 engages the stairs, for example as shown in FIG. 24. Once the track 2226 engages the stairs, the user can control the power supply 2222 to operate the motor 2286. The motor 2286 rotates the endless belts 2270, 2278. As the endless belts rotate 2270, 2278, the traction on the belts 2270, 2278 assist in pulling the hand truck 2010 up the stairs. Meanwhile, the user can also assist by pulling on the handle 2230 of the hand truck 2010. To transport the hand truck 2010 down stairs, a user can control the motor 2286 to rotate the track 2226 in the opposite direction.

Figure 19:
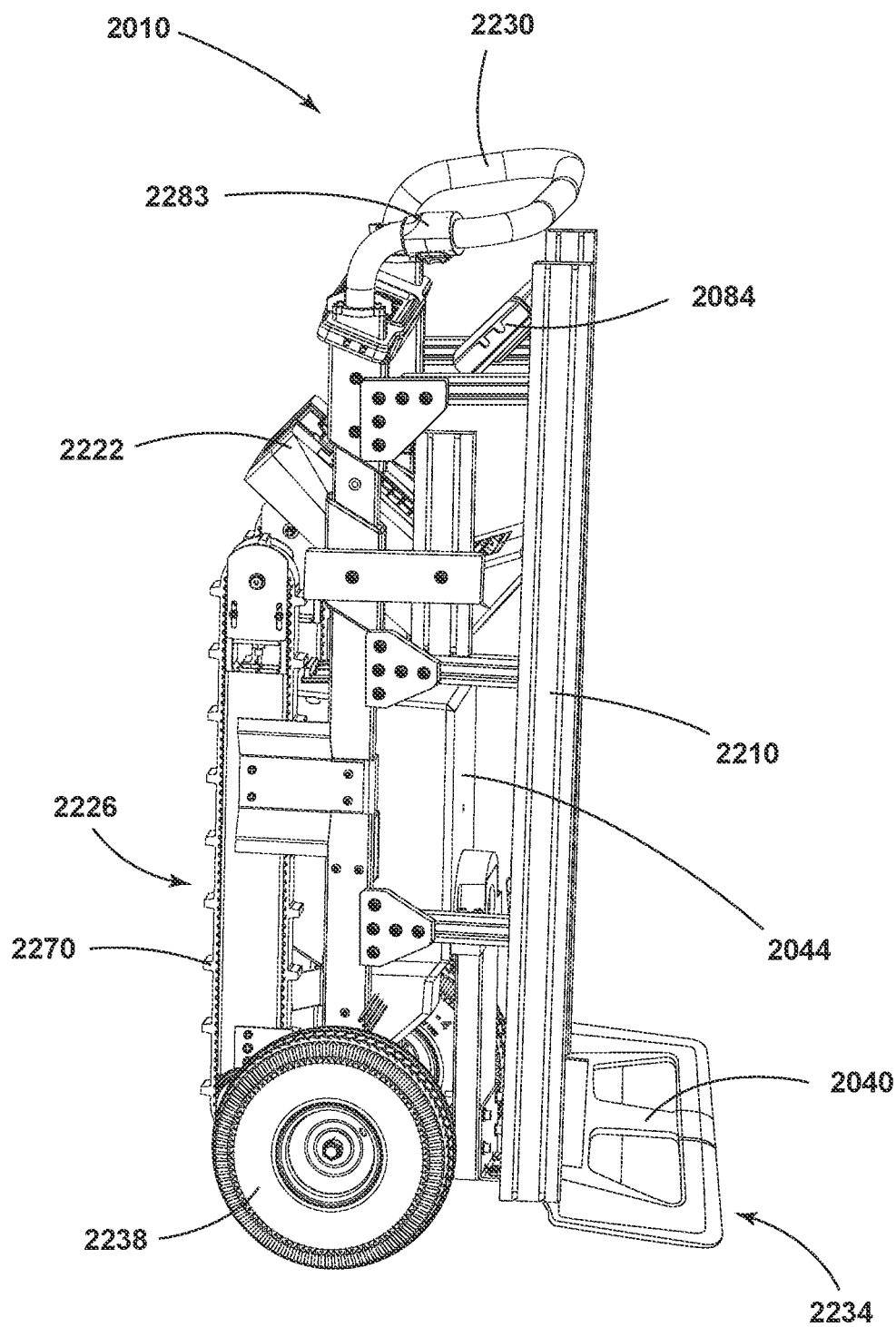
FIG. 19 is a perspective view of a transportable machine, illustrating a track of the transportable machine in a stored position.
Figure 20:
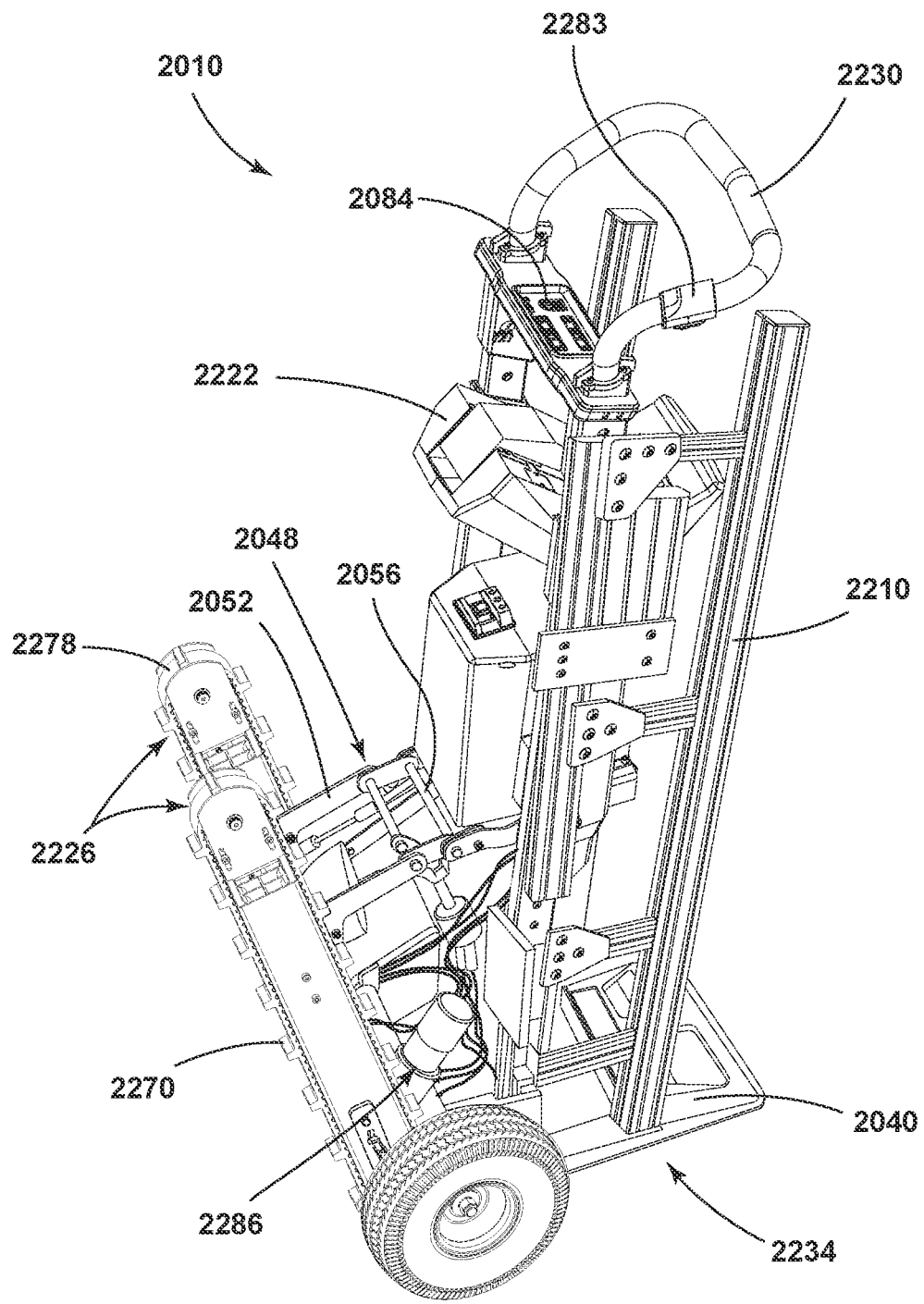
FIG. 20 is another perspective view of the transportable machine of FIG. 19, illustrating the track of the transportable machine in an extended position.

In some embodiments, the track 2226 can articulate or expand and retract relative to the frame 2210 to better climb stairs. For example, FIG. 19 illustrates the hand truck 2010 in a first (stored) position. In this position, the loading plate member 2040 of the base 2234 of the hand truck 2010 is supported on a surface to facilitate supporting of the load. FIGS. 20 and 24 illustrate the hand truck 2010 in a second, extended (operational) position. In the second position, the track 2226 is moved or pivoted away from the frame 2210. In the illustrated embodiment, the track 2226 includes an axle positioned proximate the base 2234, and the track 2226 is movable (e.g., pivotable) between the first position and the second position about the axle. The illustrated hand truck 2010 further includes a lock mechanism 2048 for maintaining the track 2226 in the second position. The illustrated lock mechanism 2048 includes a sub frame 2052 movably coupled to the frame 2210, and a latch 2056 (i.e., handle latch) selectively coupled to the sub frame 2052. The latch 2056 may be operated by a user using one hand. In particular, when the hand truck 2010 is in the second, extended position, the wheels 2238 are tilted away from the stairs such that the only the track 2226 is configured to contact the stairs.

With reference to FIGS. 21-23, the hand truck 2010 further includes a lifting system 2060 to facilitate tilting of the hand truck 2010 toward or away from a surface. In the illustrated embodiment, as shown in FIGS. 21-23, the lifting system 2060 includes an air bag member 2064 supported by the base 2234. More specifically, the illustrated air bag member 2064 is positioned between the loading plate member 2040 and a lifting plate member 2068 of the base 2234. The lifting system 2060 further includes a pump 2072 and a foot pedal member 2076 supported by the frame 2210 and track 2226. The pump 2072 is electrically coupled to the power supply 2222. The illustrated pump 2072 and foot pedal 2076 are positioned proximate the back side of the frame 2210. The air bag member 2064 is configured to be inflated such that the loading plate member 2040 moves or pivots relative to the lifting plate member 2068. The inflation of the air bag member 2064 adjusts the hand truck 2010 from a vertical or loading state to a tilted state (FIG. 23). A release member 2080 is provided proximate the handle 2230 for releasing or deflating the air bag member 2064 from the tilted state to the loading state. The release member 2080 includes an actuator (e.g., lever) operable by a user. In other embodiments, instead of the air bag member 2064, the lifting system 2060 includes a powered actuator such as a gas cylinder, a piston, or other mechanical means, to pivot the loading plate member 2040 relative to the lifting plate member 2068. Still further, in other embodiments, the lifting plate member 2068 may include a wheel coupled thereto to facilitate guiding of the hand truck 2010 on a flat surface. The lifting system 2060 is configured to facilitate tilting of the hand truck 2010 toward the track 2226, thereby reducing the need to manual tilt the hand truck 2010 toward the track 2226.

The handle 2230 includes a control system having a plurality of switches 2083 positioned on the handle 2230 and a control panel 2084 positioned proximate a top side of the hand truck 2010. The control system includes a controller electrically connected to the motor 2286 for controlling operation of the hand truck 2010. In particular, the plurality of switches 2083 on the handle 2230 includes an actuator (e.g., trigger) for controlling operation of the track 2226. In the illustrated embodiment, the switches 2083 include a first switch for turning on and off the motor 2286. Still further, in other embodiments, the handle 2230 may also contain controls for additional functions of the stair climbing hand truck 2010 (e.g., variable speed). The illustrated control panel 2084 is positioned on the top side of the stair climbing hand truck 2010 to facilitate access of the user to the control panel 2084 for changing settings, features and other functions of the hand truck 2010.

Figure 25:
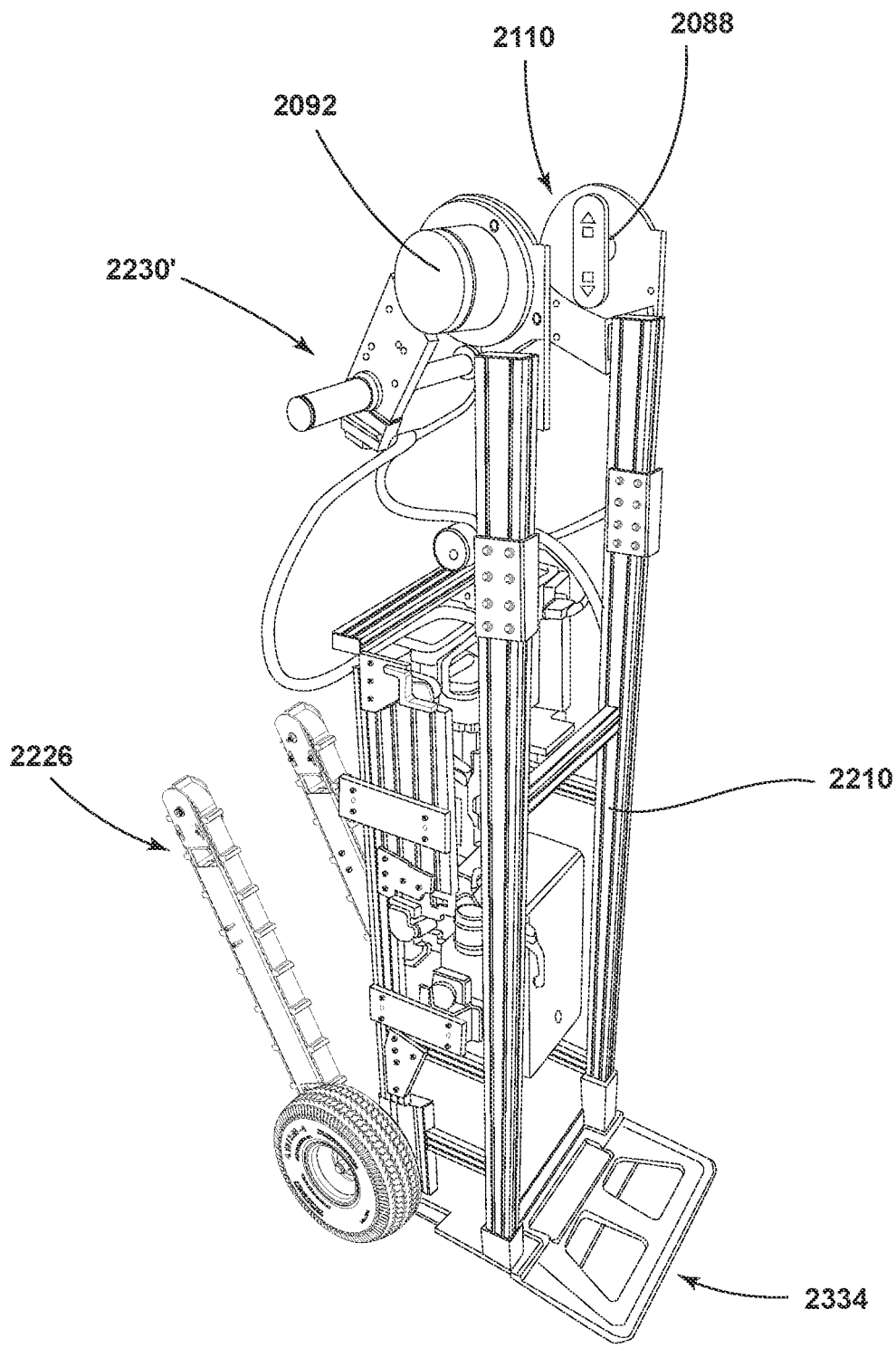
FIG. 25 is a perspective view of another transportable machine embodying the disclosure, illustrating a handle of the transportable machine in a first position.
Figure 26:
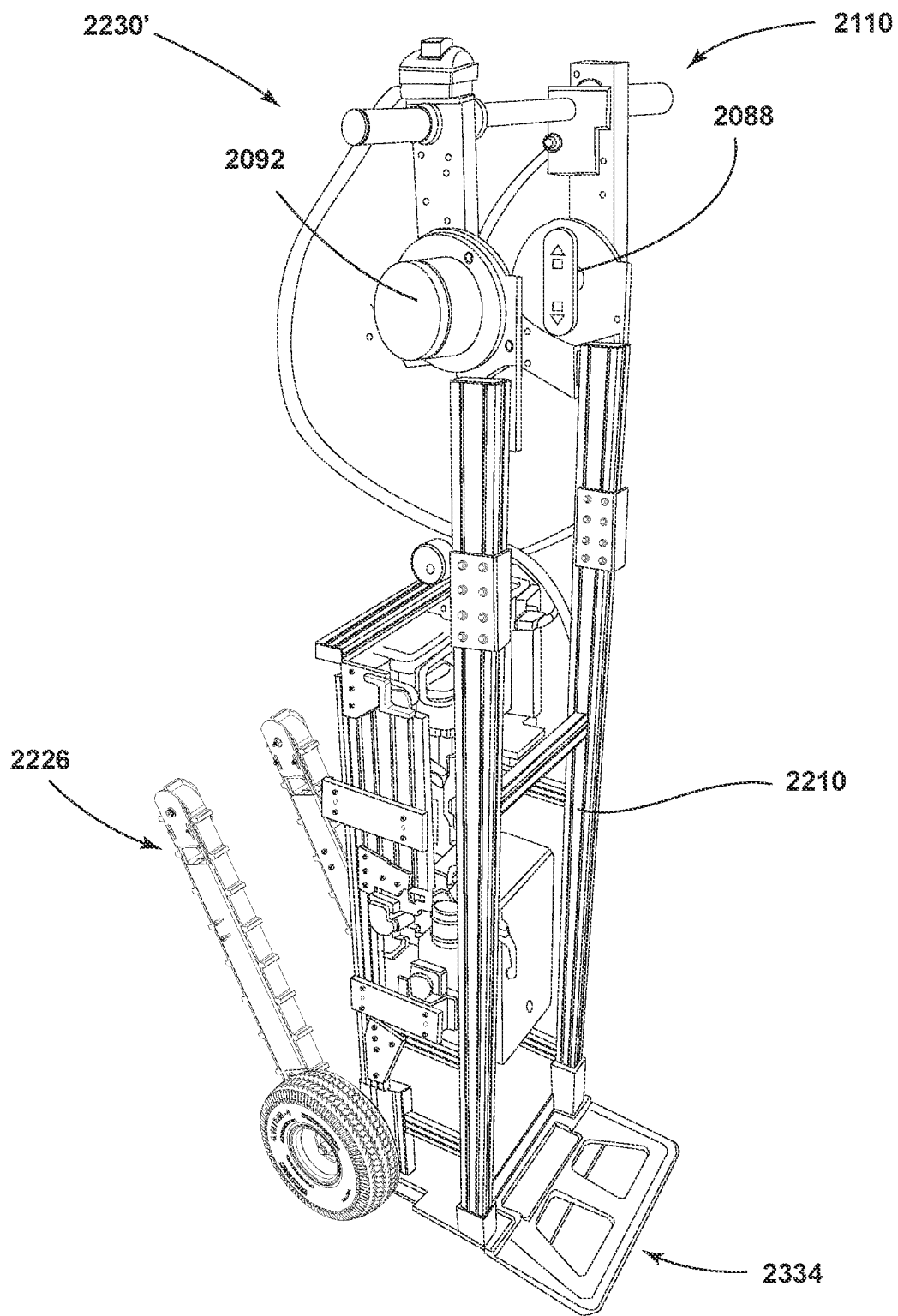
FIG. 26 is another perspective view of the transportable machine of FIG. 25, illustrating the handle in a second position.

FIGS. 25-26 illustrate a dolly or hand truck 2110 according to another embodiment of the disclosure. The hand truck 2110 includes structure similar to the hand truck 2010 with like features being represented by like reference numerals. As will be understood, the features shown and described herein with respect to the other embodiments of a transportable machine may be used in combination with the features shown and described with respect to the hand truck 2110.

In this embodiment, the handle 2230' is movable between a first, angled position (FIG. 25) and a second, extended position (FIG. 26). In the illustrated embodiment, the handle 2230' is pivotable about a pin 2088. The handle 2230' further includes an adjustment mechanism for adjusting the handle 2230' between the first position and the second position. The illustrated adjustment mechanism includes an actuator 2092 (e.g., pad) operatively coupled to the pin 2088. A user may actuate the actuator 2092 (e.g., push) for disengaging the pin 2088 from a detent mechanism, thereby adjusting the handle 2230' between the first and second positions. The first position may facilitate movement of the hand truck 2110 on a flat surface by a user. The second position may facilitate movement of the hand truck 2110 on stairs by a user.

Figure 27:
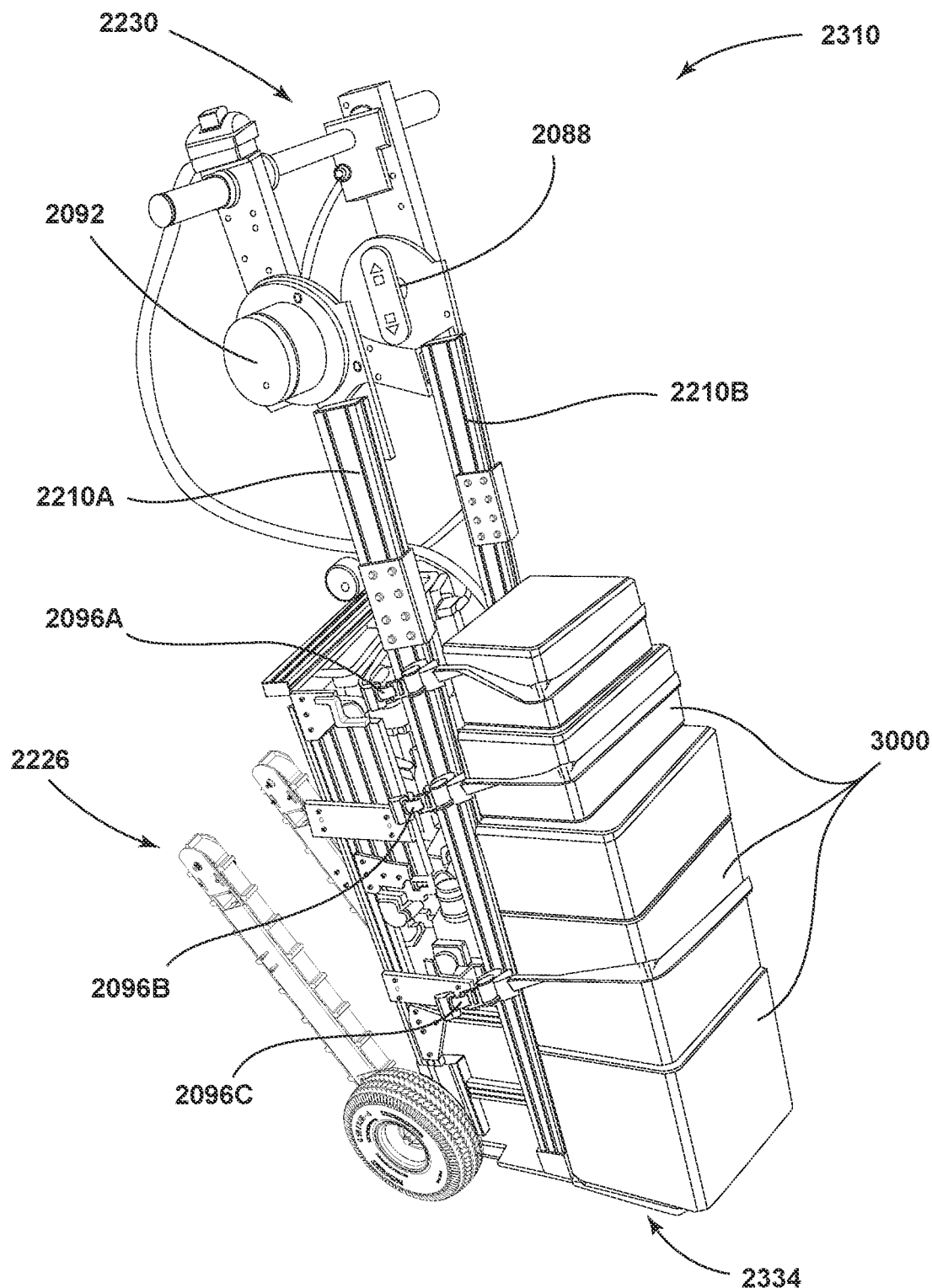
FIG. 27 is a perspective view of yet another transportable machine embodying the disclosure, illustrating a securing mechanism.
Figure 28:
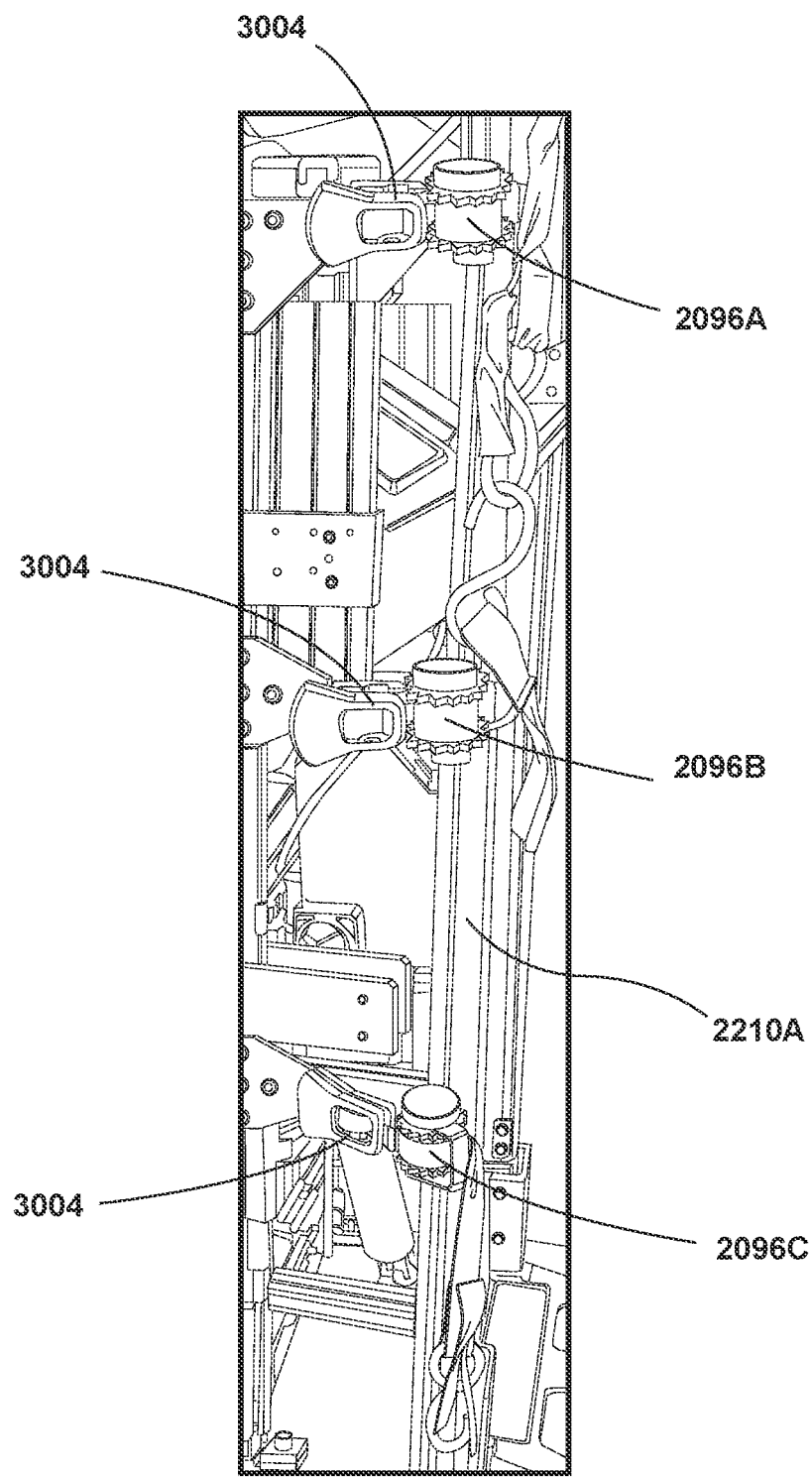
FIG. 28 is a partial side view of the transportable machine of FIG. 27.

FIGS. 27-28 illustrates a dolly or hand truck 2310 according to another embodiment of the disclosure with like features being represented by like reference numerals. As will be understood, the features shown and described herein with respect to the other embodiments of a transportable machine may be used in combination with the features shown and described with respect to the hand truck 2310.

The hand truck 2310 includes structure similar to the hand truck 2010 with like features being represented by like reference numerals. In this embodiment, the hand truck 2310 includes a securing mechanism 2096 to facilitate securing of a load 3000 received in the space 2044 defined by the hand truck 2310. In the illustrated embodiment, the hand truck 2310 includes a plurality of adjustable straps 2096A-C. In some embodiments, the adjustable straps 2096A-C are ratchet straps. Additionally or alternatively, the adjustable straps 2096A-C may be retractable straps. Each of the straps 2096A-C is supported by the frame 2210. In particular, each strap 2096A-C extends from a first frame member 2210A of the frame 2210 to a second frame member 2210B in a lateral direction relative to the space 2044 configured to receive the load 3000. Each strap 2096A-C is adjustable to individually lengthen or shorten each strap 2096A-C. In some embodiments, one or more of the straps 2096A-C is automatically retractable. In the illustrated embodiment, the securing mechanism 2096 includes three straps 2096A-C. In other embodiments, the hand truck 2310 may include one or more straps. As shown in FIG. 28, the ratchet mechanism of each adjustable strap 2096A-C is secured to a support member 3004 (e.g., loop) positioned on the first frame member 2210A.

Although the disclosure is described with reference to discrete embodiments, variations of the sewer cleaning machines and hand trucks exist within the spirit and scope of the disclosure. The features shown and described herein with respect to one of the embodiments of a transportable machine may be used in combination with any of the features shown and described with respect to another embodiment of a transportable machine. For example, the following features may be used in any combination with one another, including but not limited to, the belt tensioning assembly (e.g., shown in FIGS. 7-12), the stands (e.g., shown in FIG. 18), the movable track assembly (e.g., shown in FIG. 20), the lifting assembly (e.g., shown in FIG. 21-23), or the movable handle (e.g., shown in FIGS. 25-26). Additionally, any of the aforementioned features may be used in combination with the various control features, including but not limited to, the lock out system, which prevents a machine motor from being operated simultaneously with the track motor, a power monitoring system, which warns a user or shuts down the track motor when the power is insufficient to climb a full set of stairs, or a variable speed control system that operates the track at different speeds depending on whether the transportable machine is climbing up or down a set of stairs.

What is claimed is:
1. A transportable machine, comprising:
an elongated frame having a top end and a bottom end;
a handle disposed on the top end of the frame;
a base disposed on the bottom end of the frame, the base and the frame together defining a space configured to receive and support a load;
a wheel disposed on the bottom end of the frame;

a track coupled to the frame, the track including
   a first roller,
   a second roller,
   an endless belt configured to rotate about the first and second rollers, and
   a belt tensioning assembly configured to tension the endless belt, the belt tensioning assembly including a bracket supporting the first roller, a mount coupled to the frame, and a single adjustment member accessible on each side of the endless belt and configured to adjust the position of the bracket relative to the mount to adjust a tension of the endless belt; and
a motor coupled to the second roller, the motor operable to drive the endless belt.

2. The transportable machine of claim 1, wherein the endless belt includes a recess extending along an inside surface, the recess receiving a rib on the frame to align the endless belt relative to the frame.

3. The transportable machine of claim 1, wherein the track further includes a third roller, a fourth roller, and a second endless belt configured to rotate about the third and fourth rollers.

4. The transportable machine of claim 1, further comprising a sewer cleaning machine supported by the base, the sewer cleaning machine including a drum, a cable positioned at least partially within the drum, and a second motor driving rotation of the drum.

5. The transportable machine of claim 1, wherein the handle is movable relative to the elongated frame between an angled position, in which the handle extends generally downward from the top end of the frame, and an extended position, in which the handle extends generally upward from the top end of the frame.

6. The transportable machine of claim 1, wherein the track is movable relative to the elongated frame between a stored position and an extended position, wherein the track is positioned farther away from the frame when in the extended position than in the stored position.

7. The transportable machine of claim 1, wherein the single adjustment member is positioned between the first roller and the second roller.

8. A transportable machine, comprising:
an elongated frame having a top end and a bottom end;
a handle disposed on the top end of the frame;
a base disposed on the bottom end of the frame, the base and the frame together defining a space configured to receive and support a load;
a wheel disposed on the bottom end of the frame;
a track coupled to the frame, the track including a first roller, a second roller, a frame member extending between the first and second rollers, and an endless belt configured to rotate about the first and second rollers, the endless belt having a recess formed on an inside surface of the endless belt, the recess receiving a rib on the frame member to align the endless belt relative to the frame member; and
a motor coupled to the second roller, the motor operable to drive the endless belt.

9. The transportable machine of claim 8, wherein the track further includes a bracket positioned adjacent the endless belt and configured to inhibit the endless belt from slipping off of the frame.

10. The transportable machine of claim 8, wherein the track further includes a third roller, a fourth roller, and a second endless belt configured to rotate about the third and fourth rollers.

11. The transportable machine of claim 8, further comprising a belt tensioning assembly configured to tension the endless belt.

12. The transportable machine of claim 8, further comprising a sewer cleaning machine supported by the base, the sewer cleaning machine including a drum, a cable positioned at least partially within the drum, and a second motor driving rotation of the drum.

13. The transportable machine of claim 12, wherein operation of one of the first motor and the second motor prevents operation of the other of the first motor and the second motor.

14. The transportable machine of claim 8, wherein the recess also receives a rib on the second roller to align the endless belt relative to the frame member.

* * * * *